(12) United States Patent
Moetteli

(10) Patent No.: US 7,249,315 B2
(45) Date of Patent: Jul. 24, 2007

(54) SYSTEM AND METHOD OF CREATING AND FOLLOWING URL TOURS

(76) Inventor: John Brent Moetteli, Geneva 12, Geneva (CH)

( * ) Notice: Subject to any disclaimer, the term of this patent is extended or adjusted under 35 U.S.C. 154(b) by 870 days.

(21) Appl. No.: 09/951,572

(22) Filed: Sep. 13, 2001

(65) Prior Publication Data

US 2002/0049809 A1   Apr. 25, 2002

Related U.S. Application Data

(63) Continuation-in-part of application No. 09/447,293, filed on Nov. 23, 1999, and a continuation-in-part of application No. PCT/US00/17409, filed on Jun. 24, 2000.

(51) Int. Cl.
*G06F 17/24* (2006.01)
(52) U.S. Cl. .................... 715/513; 715/847
(58) Field of Classification Search ............ 715/739, 715/738, 760, 501.1, 513, 847
See application file for complete search history.

(56) References Cited

U.S. PATENT DOCUMENTS

| | | | |
|---|---|---|---|
| 5,712,979 A | 1/1998 | Graber et al. | |
| 5,717,860 A | 2/1998 | Graber et al. | |
| 5,787,254 A | 7/1998 | Maddalozzo, Jr. | |
| 5,809,250 A | 9/1998 | Kisor | |
| 5,826,267 A | 10/1998 | McMillan | |
| 5,864,863 A | 1/1999 | Burrows | |
| 5,924,090 A | 7/1999 | Krellenstein | |
| 5,933,822 A | 8/1999 | Braden-Harder et al. | |
| 5,933,827 A | 8/1999 | Cole et al. | |
| 6,009,429 A * | 12/1999 | Greer et al. | 715/760 |
| 6,037,934 A * | 3/2000 | Himmel et al. | 715/760 |
| 6,055,538 A | 4/2000 | Kessenich et al. | |
| 6,073,135 A | 6/2000 | Broder et al. | |
| 6,195,679 B1 * | 2/2001 | Bauersfeld et al. | 715/739 |
| 6,314,423 B1 * | 11/2001 | Himmel et al. | 715/513 |
| 6,334,145 B1 * | 12/2001 | Adams et al. | 715/738 |
| 6,334,146 B1 | 12/2001 | Parasnis et al. | |

(Continued)

OTHER PUBLICATIONS

Johnson et al., Automatic touring in a hypertext system, Proceedings of the International Phoenix Conference on Computers and Communications, Tempe, Mar. 23, 1993, New York, IEEE, US, vol. Conf. 12, p. 524-30.

(Continued)

*Primary Examiner*—Doug Hutton
(74) *Attorney, Agent, or Firm*—Moetteli & Associés SàRL

(57) ABSTRACT

A browsing method encoded on a computer-readable medium is provided. The method creates customized summaries of web pages and comprises multiple steps. In a first step, from a thematic or project-based listing of URL links, a selected URL link is activated. In a second step, a tour creation dialog is opened. In a third step, the user is presented with a menu option that enables the user to identify an existing tour or create a new tour. In a fourth step, if the user identifies an existing tour, the URL so selected is added into this existing tour. In a fifth step, if the user chooses to create a new tour, an input window is presented to the user that prompts the user to input a tour name. In a sixth step, once the user inputs the tour name, the new tour is saved.

5 Claims, 41 Drawing Sheets

U.S. PATENT DOCUMENTS 6,476,827 B1 * 11/2002 Porter ........................ 715/738
6,572,662 B2 * 6/2003 Manohar et al. ............ 715/526
6,788,316 B1 * 9/2004 Ma et al. .................... 715/739

OTHER PUBLICATIONS

Wexelblat et al., Footprints: History-Rich Tools for Information Foraging, Chi' 99 Conference Proceedings Human Factors in Computing Systems, May 15, 1999, p. 270-77.

Keller et al., A bookmarking service for organizing and sharing URLs, Computer Networks and ISDN Systems, vol. 29, No. 8-13, Sep. 1997, p. 1103-14.

Newfield et al., Scratchpad: Mechanisms for Better Navigation in Directed Web Searching, ACM Symposium on User Interface Software and Technology, 1998, p. 1-8.

Tauscher et al., How people revisit web pages: empirical findings and implications for the design of history systems, International Journal of Human-Computer Studies, Academic Press, New York, vol. 47, No. 1, Jul. 1997, p. 97-137.

Graham-Cumming, Hits and miss-es: a year watching the web, Computer Networks and ISDN Systems, vol. 29, No. 8-13, Sep. 1997, p. 1357-65.

* cited by examiner

| Table 1 (HTML document) | | | | |
|---|---|---|---|---|
| NETWORK ADMINISTRATOR'S AUTHORIZATION TABLE | | | | |
| indiv. user names | User Cat. | Authorized Projects | Restrictions | Supv |
| 01 | mana. | CLIENT 082361 | NONE | DJK |
|  |  | CLIENT 061759 | NO FORBID. WORDS |  |
|  |  | SUBCON 040793 | NONE |  |
|  |  | PERSONAL | OUTSIDE OFFICE HOURS |  |
| 02 | staff | CLIENT 021463 | NONE | HGG |
|  |  | PERSONAL | RESTRICTED: ADULT CONT. |  |
| 03 | lawyer | CLIENT 032326 | RESTRICTED Chinese wall | DM |
|  |  | PERSONAL | NONE |  |
|  |  | ADMIN 031366 | NONE |  |
|  |  | ADMIN 092536 | NONE |  |

FIG. 8

Permit access to the following user categories:

[ ] All    [ ] admin    [ ] lawyers    [ ] staff

Limit access to [_____] (user name)

[ ] logoff without modifying access

Table 2 (HTML document)

URL Listing for Project Name 100
As of [Date]

1. Project Global Navigation History (permanent—editable by syst. admin)

| C1 | C2 | C3 | C4 | C5 | C6 |
|---|---|---|---|---|---|
| 1st Site Description | Site type | Keywords (if appl) | Associated URL | No. of visits | pioneer user |
| *Marked for deletion | *** | *** | *** | *** | *** |
| 3rd Site Description | Site type | Keywords (if appl) | Associated URL | No. of visits | pioneer user |
| ... | | | | | |
| Nth Site Description | Site type | Keywords (if appl) | Associated URL | No. of visits | pioneer user |

2. Associated Bookmarks (user editable if a user association)

| Bookmark Name | User association |
|---|---|
| Patent Info | |
| Copyright Rules | |
| Tax forms | |
| *SEC FAQ* | JBM |

3. Research Summary – User Navigation History (last session, user specific)
user name: _____

| C1 | C2 | C3 | C4 | C5 |
|---|---|---|---|---|
| 1st Site Description | Site type | Keywords (if appl) | Associated URL | Duration of visit |
| *Marked for deletion | *** | *** | *** | *** |
| ... | | | | |
| Nth Site Description | Site type | Keywords (if appl) | Associated URL | Dur. of visit |

Total research time: _____ this section includes navigation history including online time for each URL, from last session of the user currently logged on

FIG. 10

```
                              Table 3 (HTML document)                  ┌─ 101
                                                    ┌─────────────────────┐
       TBM Listing Data Structure                   │ e-mail to personal address │
       User      Date                               └─────────────────────┘

C1                  C2         C3                    C4
       1st Site Description  Site type  Keywords (if appl)    Associated URL
       2nd Site Description  Site type  Keywords (if appl)    Associated URL
       . . .
       . . .
       Nth Site Description  Site type Keywords (if appl)     Associated URL ☐ Continue same research session using link above?
       ☐ Begin a new research session?
       ☐ Edit and Save TBM listing for presentation upon next logon?
```

FIG. 11

SYSTEM AND METHOD OF CREATING AND FOLLOWING URL TOURS

REFERENCE TO PRIOR APPLICATIONS

This is a continuation-in-part application of U.S. patent application Ser. No. 09/447,293 filed Nov. 23, 1999 and PCT/US00/17409 (WO0101275), filed Jun. 24, 2000, the contents of which are incorporated herein by reference thereto.

TECHNICAL FIELD

This invention relates to a method and system of viewing resources on a network and, more particularly, to a browsing method and system for inputting navigational instructions in a multi-server computer environment such as the "Internet".

BACKGROUND OF THE INVENTION

The use of the Internet has seen rapid growth over the last few years, fueled in significant part by availability and use of web browsing software that permits access, via a graphical user interface ("GUI") to network servers which are part of the World Wide Web. These servers provide access to documents known as "web pages" or "web sites" using a Hypertext Transfer Protocol ("HTTP"). HTTP is an application protocol that provides user access to these web pages having various formats including text, graphics, images, sound, and dynamic features. Hypertext Markup Language ("HTML") is the standard page description language used with HTTP and provides basis document formatting. HTML allows a web page developer to specify these hypertext links to other servers and to other files. A user using an HTML-compliant browser may specify a link via a Uniform Resource Locator ("URL"). When the user does so, the client browser makes a transmission control protocol/Interface protocol ("TCP/IP") request to the server associated with the link and consequently receives the corresponding web page formatted according to HTML. Note that XML is a substitute for HTML.

The developers of prior art web browsers such as "MOSAIC", "NETSCAPE NAVIGATOR", and "MICROSOFT INTERNET EXPLORER" have focused their efforts on providing a rapid and efficient means for a user to access web pages having sophisticated graphical capabilities. Such web pages typically offer a wide variety of attention-generating features which include sound, animated graphics, banner advertisements, and continuously updated dynamic content, often tailored to a user's personal interests, side by side with lexically unordered hypertext links. These features, for the most part, improve the sensual experience a user has when researching the Internet and often distract the user away from their initial research goal. This distraction causes significant losses in productivity, as suggested by a widely known University of Michigan study which determined that an employee accomplishes almost twice as much by working on a single task for an hour than he does by working on that same task in 12, separate five minute intervals (cited for example in J. Harris Morgan, *Can We Manage Time?*, Texas Bar Journal, Vol 62, No. 7, 668 (July 1999)).

Intelliseek, Inc. of Cincinnati, Ohio, offers a method, known as "BULLSEYE" which uses automated agents to filter and find information which a user deems relevant to their search (see product information, available at http://www.intelliseek.com). Further, search results may optionally be saved under a particular file name for later retrieval. Still further, a "tracking" feature permits a user to program an agent tracker to automatically retrieve information of interest to the user when the user is logged on to the Internet. However, the search itself is not attributed to any particular project name or file during the research. No features are provided to enable the user to re-access the saved research based on a key word search of such saved projects.

Another firm, WebKeys Incorporated of California, provides a method, known as "PROWLER" (information available at http://www.webkeys.com/aboutwk.htm) that requires that individual users log on to the Internet using an individual user name and password. Access to certain categories of websites (i.e., "All age", "Under 14, "Teenagers", "Adult content", and "Explicit violence/sexual content") is granted or denied based on privileges that are determined by a system administrator. Further, a navigation history, associated with the user, is saved for administrative censoring purposes.

Other web resources such as "WESTLAW" and "LEXIS-NEXIS" provide Internet portals or web pages that require login by ID and password (i.e., subscriber sites) in order to gain access. Further, prior to beginning research in these secure subscriber sites, a client matter number may be input, which, optionally, is checked against a database of the user's client matter numbers, to confirm accuracy. However, because these are not browser-based, the user may leave these subscriber sites and do other task/research on the Internet that is not attributed to the client matter number. Thus, little improvement over prior art systems or methods of performing Internet research is offered.

Thus, no tools are available on the market that aid in directing or managing a user's Internet research such that one is able to concentrate on one project at a time. The lack of such tools is consistent with the name given the process of performing research on the World Wide Web, namely "surfing" or "browsing", terms which imply a rather undirected and undisciplined approach to doing research and the lack of a predetermined business goal. Consequently, as has been the experience with many businesses that are using the web for project research, much time is wasted as the users, distracted by the attention-generating features, spend employer or client time researching subjects of personal interest or of interest to another project. Such distracting features thus make focused research using the prior art browsing methods almost impossible.

Further, no secure and convenient means has been provided which allows access to documents posted on a publicly accessible server or intranet which does not require the manual input a decryption key, Further no means is available whereby, solely information input at the time of accessing the Internet or intranet, optionally together with an IP address, decrypts such information.

Still, further, no performance measures have been developed to enable Internet searchers to access their performance with respect to their level of focus.

Bookmarks are used to mark particular Internet addresses or URLs, for later access. Lists of bookmarks can become quite long, making reviewing the contents of a list of bookmarks cumbersome.

Further, no means exists for organizing bookmarks irrespective of standard criteria, such as relevancy, to suit the information needs of a particular visitor.

Therefore, what is needed is a means to enable users having particular information needs to view the most pertinent sites first. In particular, what is needed is a system and a method that brings to the fore, sites which may be of particular interest to a particular type of user or an individual such as a client.

SUMMARY OF THE INVENTION

A browsing method and system is provided to follow a listing of URL links in a data register, from one link to another, and to reorganize based on preferences, such as by user-defined relevancy or by date of creation, etc. The method is adapted to manage Internet research in a research session by use of an internet browser. This is accomplished in that the navigation on the Internet by a user or users involves the automatic association of URLs that are accessed with a pre-defined project name. Further, information in respect to selected of these accessed URLs is able to be stored in a computer storage medium, this information including the URL address and a reference to a project name. This method and system solve the problems identified above by enabling the creation of a summarizing tour of URL links associated with a project or theme that can be followed by a user. The tour creation method includes the following steps. In a first step, a link is activated. In a second step, when initiated, a tour creation dialog opens. In a third step, the user is presented with a menu option that enables him to identify an existing tour or create a new tour. In a fourth step, if the user identifies an existing tour, the URL so selected is added into this existing tour using tour link editing submethod. In a fifth step, if the user chooses to create a new tour, an input window is presented to the user in which he can input the name of the tour which he would like to create. In a sixth step, the user clicks "save" and the new tour is created having a single link. The user then returns to the first step to add another link to the tour.

In addition, the system stores bookmarks and navigation history in association with project names, thus presenting users with navigation tools customized to the project at hand. Further, the system provides the option of printing reports of search sessions, thus permitting the navigation history information and time online to be maintained as a record in project files for later reference or for billing purposes.

In an object of the invention, users are provided with summaries summarizing the contents of a potentially long list of links, many of which may not be of interest to them.

In a second object of the invention, such summaries can be specifically written for a particular user, and, using the commenting feature of the invention, include detailed comments of great potential interest to the user, thus reducing the time the user must spend seeking the most pertinent information in a project.

BRIEF DESCRIPTION OF THE DRAWINGS

FIG. 8 is an authorization table used in the invention.
FIG. 9 is a log-off window of the invention.

FIG. 10 is a table showing the URL listings associated with the project names of the invention.
FIG. 11 is a table of Temporary Bookmark Listings of the invention.

DETAILED DESCRIPTION OF THE PREFERRED EMBODIMENT

Figure 1:
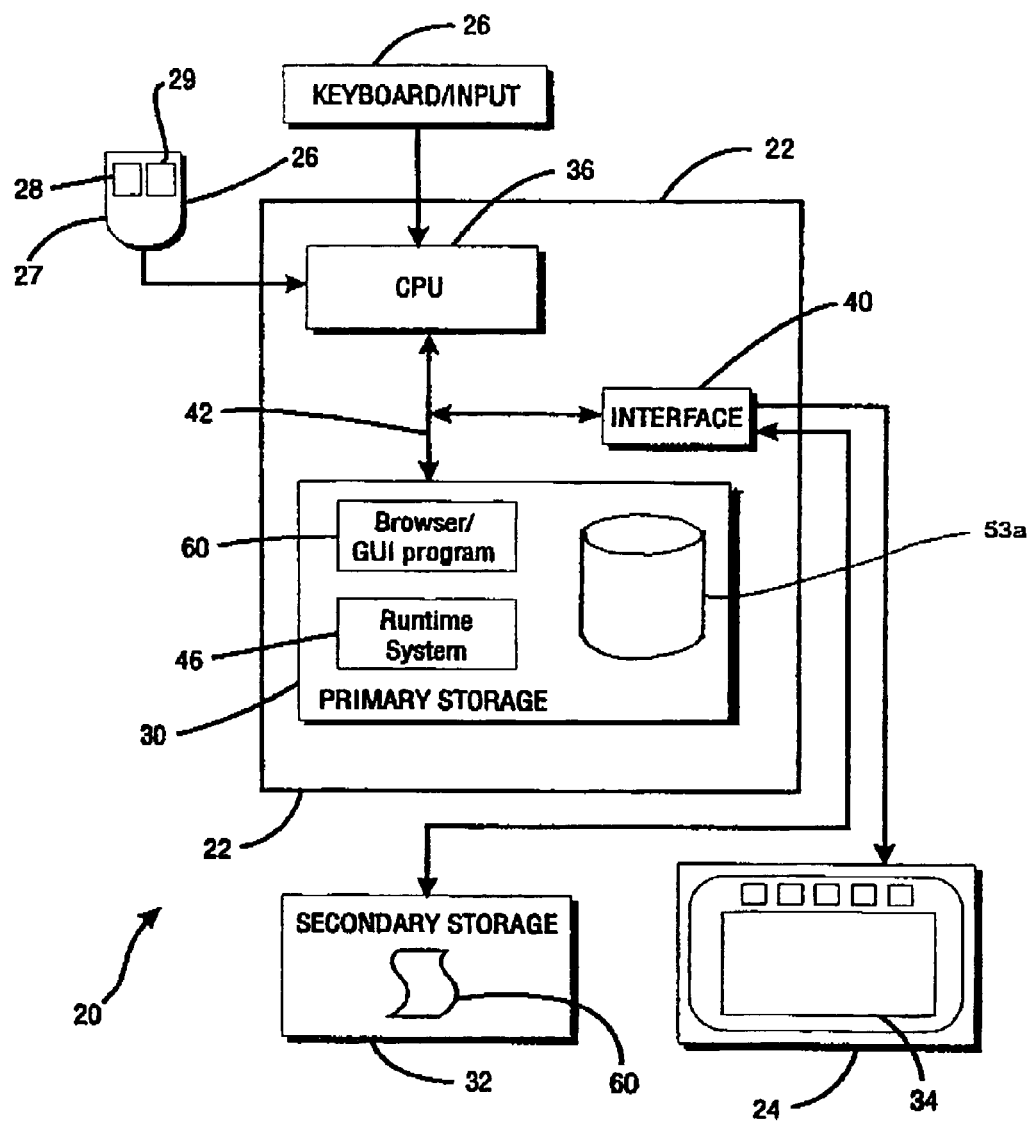
FIG. 1 is a block diagram of a system of the invention.

Referring to FIG. 1 which is a block diagram of a typical system 20 for practicing the various embodiments of the present invention, the client browsing method 60 of the present invention is encoded on a computer-readable medium and manages access by users using a computer system 20 to a network of servers 54 and 54' (shown in FIG. 2) such as the Internet. Such a computer system 20 typically includes a computer 22, a display device 24, an input device 26 such as a keyboard, a primary storage device 30, a secondary storage device 32 and a plurality of resources 23. Each resource 23 is operatively coupled to at least one of the computers 22. Resources 23 include, but are not limited to, printers, databases, special-purpose servers, security devices, modems, etc.

After loading of software encoded with the method 60 of the invention, the display device 24 displays a graphical user interface ("GUI") 34 for facilitating the display of text and graphics for the user.

Display devices 24 include printers and computer display screens such as a CRT, LED displays, and LCDs. Input devices 26 are numerous and include keyboards and pointing devices such as a mouse 27 having a left mouse button 28 and a right mouse button 29, a trackball, lightpens, thumbwheels, digitizing tablets, microphones using voice recognition software, and touch screens and pads.

The computer 22 includes a CPU 36 as well as other components with which all who are skilled in the art are familiar. For a detailed discussion of these components and their interaction, see U.S. Pat. No. 5,787,254, the content of which is incorporated by reference. The secondary storage 32 supports the browsing method 60, preferably HTTP-compliant, as well as a number of Internet access tools. The secondary storage 32 may also support other Internet services including mail transfer protocol (SMTP), e-mail, file transfer protocol ("FTP"), network transfer protocol ("NNTP") or "usenet" and remote terminal access (Telnet). The CPU 36 fetches computer instructions from primary storage 30 through an interface 40 such as an input/output subsystem connected to a bus 42. A relational database 53a in which data and relations which are shared by users, is stored in primary storage 30 and be accessed via file-server protocol.

The CPU 36 executes these fetched computer instructions. Executing these instructions enables the CPU 36 to retrieve data or write data to the primary storage 30, display information on one or more display devices 24, receive command signals from one or more input devices 26, or transfer data to secondary storage 32 or even other computer systems which collectively form a computer network 25 (shown in FIG. 2). Those skilled in the art understand that primary storage 30 and secondary storage 32 can include any type of computer storage including RAM, ROM, application specific integrated circuits ("ASIC") and storage devices which include magnetic and optical storage media such as a CD-ROM.

The primary storage 30 stores a number of items including the method 60 and a runtime environment 46. The runtime environment 46 typically is an operating system which manages computer resources, such as memory, disk or processor time, required for the method of the invention to run. The runtime environment 46 may also be a message passing system, a microkernel, dynamic loadable linkable module (s), or any other system which manages computer resources.

Figure 2:
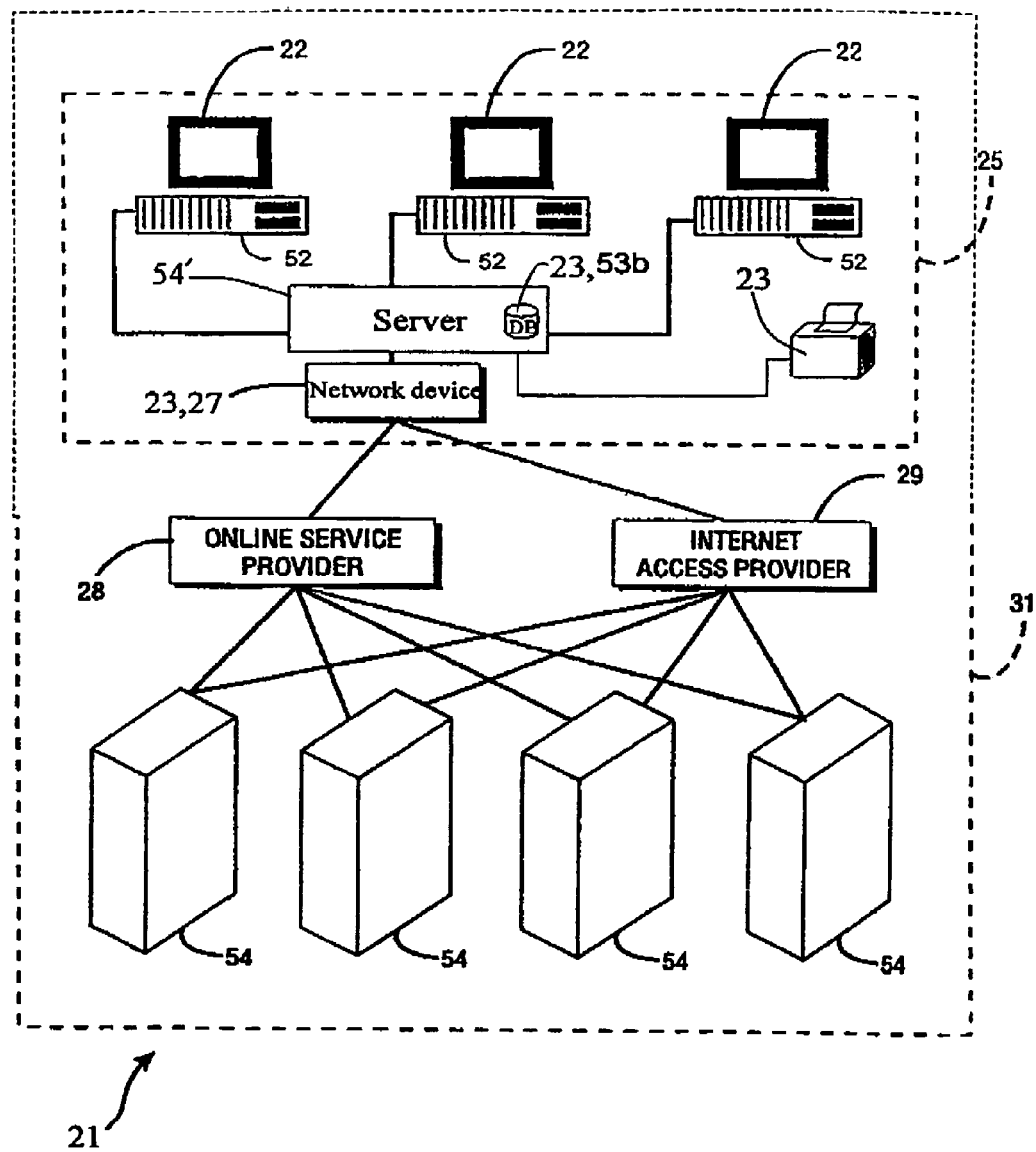
FIG. 2 is a block diagram of an alternate system of the invention.

Referring now to FIG. 2, an alternate system 21 implementing the method 60 of the present invention is shown. The system 21 includes client computers 22 arranged in a network 25 and a firewall 27 which interfaces with an online service provider 28 such as CompuServe, America Online, a subscription resource (such as "WESTLAW") and/or an Internet access provider 29. The online service provider 28 and Internet access provider 29 connect to a network 31 of servers 54 which comprise a portion of the Internet.

Figure 3:
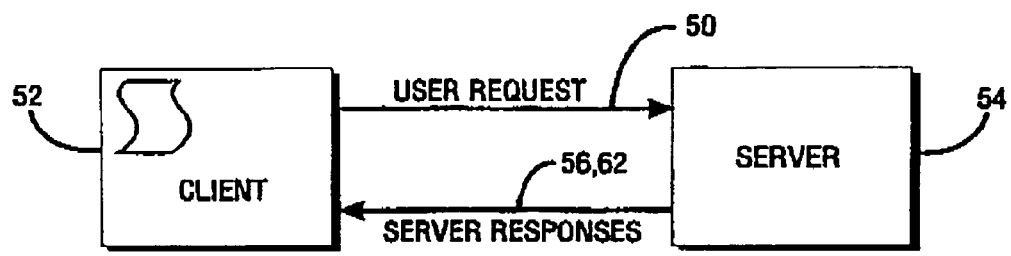
FIG. 3 is a block diagram of a client/server architecture of the present invention.

FIG. 3 illustrates a block diagram of a client/server architecture which can be utilized in accordance with the method 60 of the present invention. User requests 50 for information are sent by a client application program 52 to a server 54. The server 54 can be a remote computer system accessible over the Internet or other communications medium. Client application program 52 may be utilized with computer 22 of FIG. 1. Server 54 performs scanning and searching of raw (e.g., unprocessed) information sources (e.g., newswire feeds or newsgroups) and, based upon these user requests, presents the filtered electronic information as server responses 56 to the client process.

Figure 4:
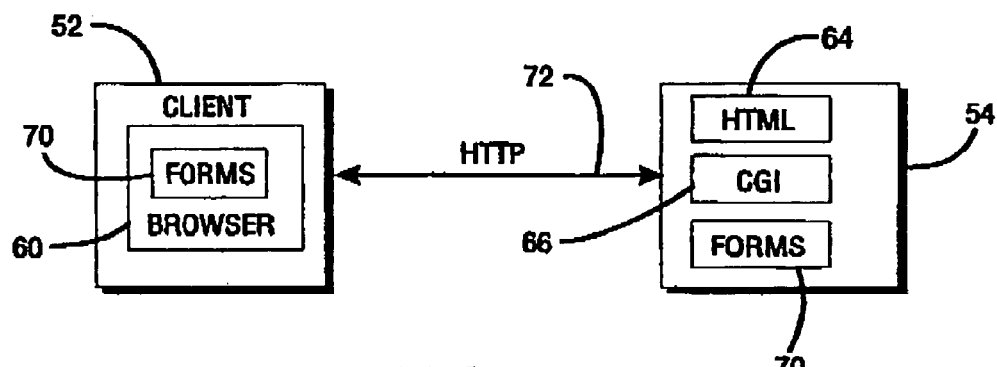
FIG. 4 is a detailed diagram of a client/server architecture of the present invention.

FIG. 4 illustrates a detailed block diagram of a client/server architecture which can be utilized in accordance with the method 60 of the present invention. Although the client 52 and server 54 are processes which are operative within two computer systems, these processes being generated from a high-level programming language (e.g. PERL), which is interpreted and executed in a computer system 20 at runtime (e.g., a workstation), it can be appreciated by one skilled in the art that they may be implemented in a variety of hardware devices, either programmed or dedicated. Client 52 and server 54 communicate using the functionality provided by an HTTP connection 72.

Further, because HTTP is a stateless protocol, every user request 50 for information from the server 54 is treated independently, with the server having no memory of previous connections. This statelessness results in the rapid and efficient transmission of hypertext documents (e.g., the web page 152 of FIG. 13).

There are four states to a HTTP connection 72. First, the connection 72 is opened. This means that contact is made between the client computer 52 and server 54 at the Internet address and port number specified by the URL. Second, the client 52 sends a message to the server 54, requesting service. This user request 50 is made up of HTTP request headers that define the "method" requested for the transaction and provide information about the capabilities of the client 52, followed by the sending of the data to the server 54. Typical HTTP methods are GET, for getting an object from a server 54, or POST, for posting data to an object on the server. Third, the server 54 sends a response to the client 52. This consists of response headers describing the state of the transaction, followed by the actual data. Fourth, the connection 72 is closed. This procedure means that a connection 72 can download only a single document or process a single transaction while the stateless nature of the transaction means that each connection knows nothing about the previous connection.

Referring again to FIG. 2, where the method 60 operates on an intranet 25, the relational database 53 is a client-server type 53b. The advantage of use of a client-server database 53b and access system is that processing on the database server 54 does not affect processing on the client 52. Either type of database 53a or 53b may be defined and managed by "PARADOX" software, by Borland International, Inc., of Scotts Valley, Calif. PARADOX for DOS is a relational database that has features required for storing, viewing, printing, changing, sorting and finding data in tables such as Table 7. PARADOX has a character user interface (GUI), supports a mouse and WINDOWS in that environment, and, together with its query by example (QBE) facility, provides all the tools which a person of ordinary skill will require in order to develop the relations and tables of the method.

Where WINDOWS NT is the operating system, Microsoft Development Tools for Rapid Application Development can be used to define the database 53 to interchange data in a manner required in the method 60. Shared data, such as project summaries, project descriptions, etc., is shared in the form of a "virtual desktop" whereby computer systems connected in a network may be operated peer-to-peer with resources shared over the net. Further, time may be aggregated from all "virtual" and "LAN" desktops working on a given project. Alternatively, a Microsoft "ACCESS" relational database, running under Microsoft "WINDOWS", may be used.

Figure 5:
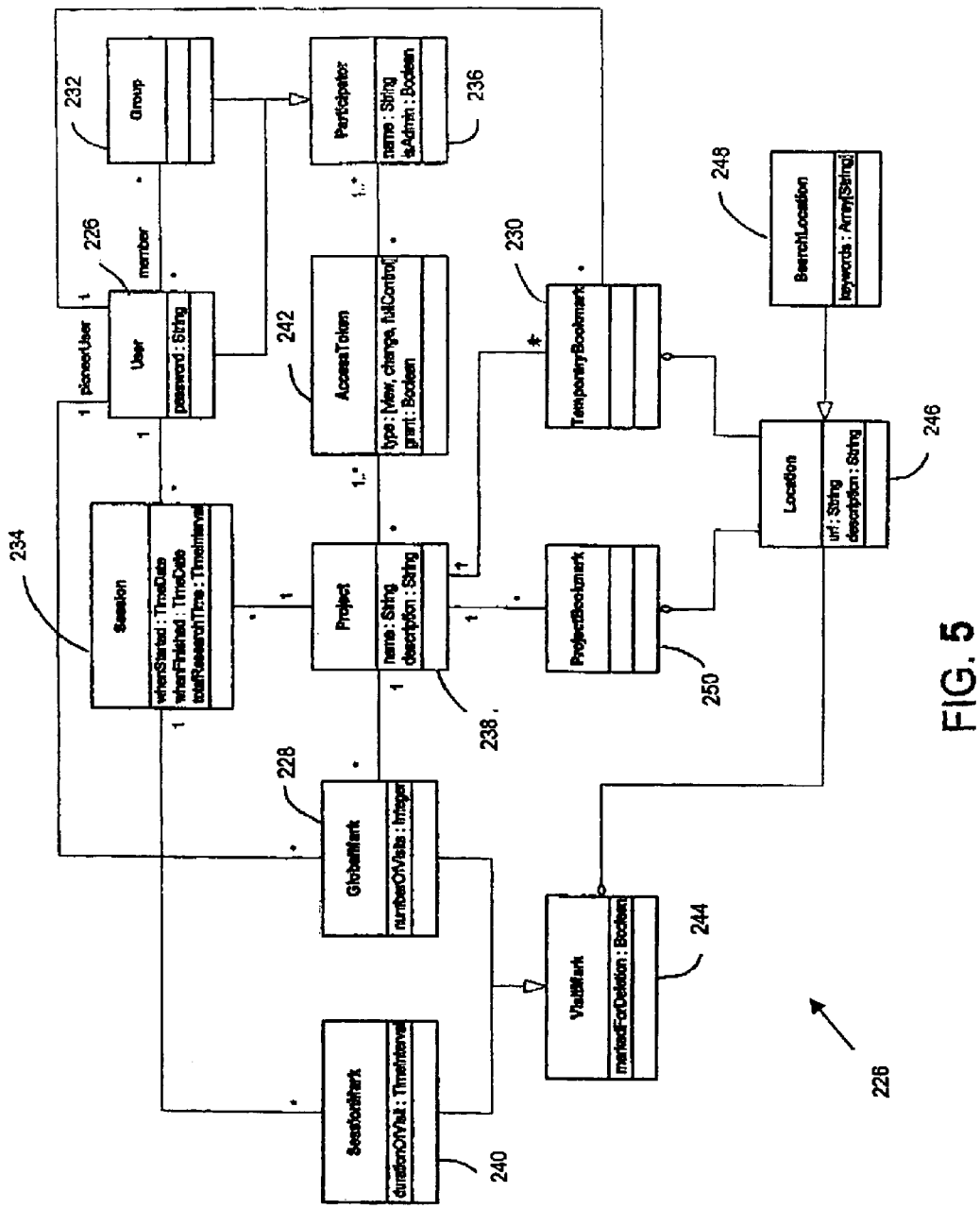
FIG. 5 is a relational UML class diagram of the method.

Referring now to FIG. 5, a schematic, Unified Modeling Language ("UML") class diagram is shown which defines the basic relations across fields of tables stored in the relational database 53.

Definitions of UML Class notation are available on the Internet at http://www.rational.com/uml. For example, according to the given notation, any one ("1") user in a user field 226 is joined to any number (".") of GlobalMarks in a GlobalMark field 228 (where the user is the pioneer user), any number of Temporary Bookmarks ("TBMs") in a temporary bookmark field 230, any number of groups in a group/category field 232 (and vice versa), and any number of research sessions in a session field 234, the user being generally associated with a participator field 236. Further, any name of a project folder (i.e., a project name 100) in the project field 238 is associated with any number of sessions in the session field 240, any number of GlobalMarks in the GlobalMark field 228, and a defined number of AccessTokens in the AccessToken field 242. A VisitMark field 244 indicates which URLs have been marked for deletion.

A location field 246 associates each URL with a description. A SearchLocation field 248 associates keywords with each URL. The Project field 238 associates a project description with a project name 100. A ProjectBookmark field 250 associates URLs with project names 100.

Figure 6:
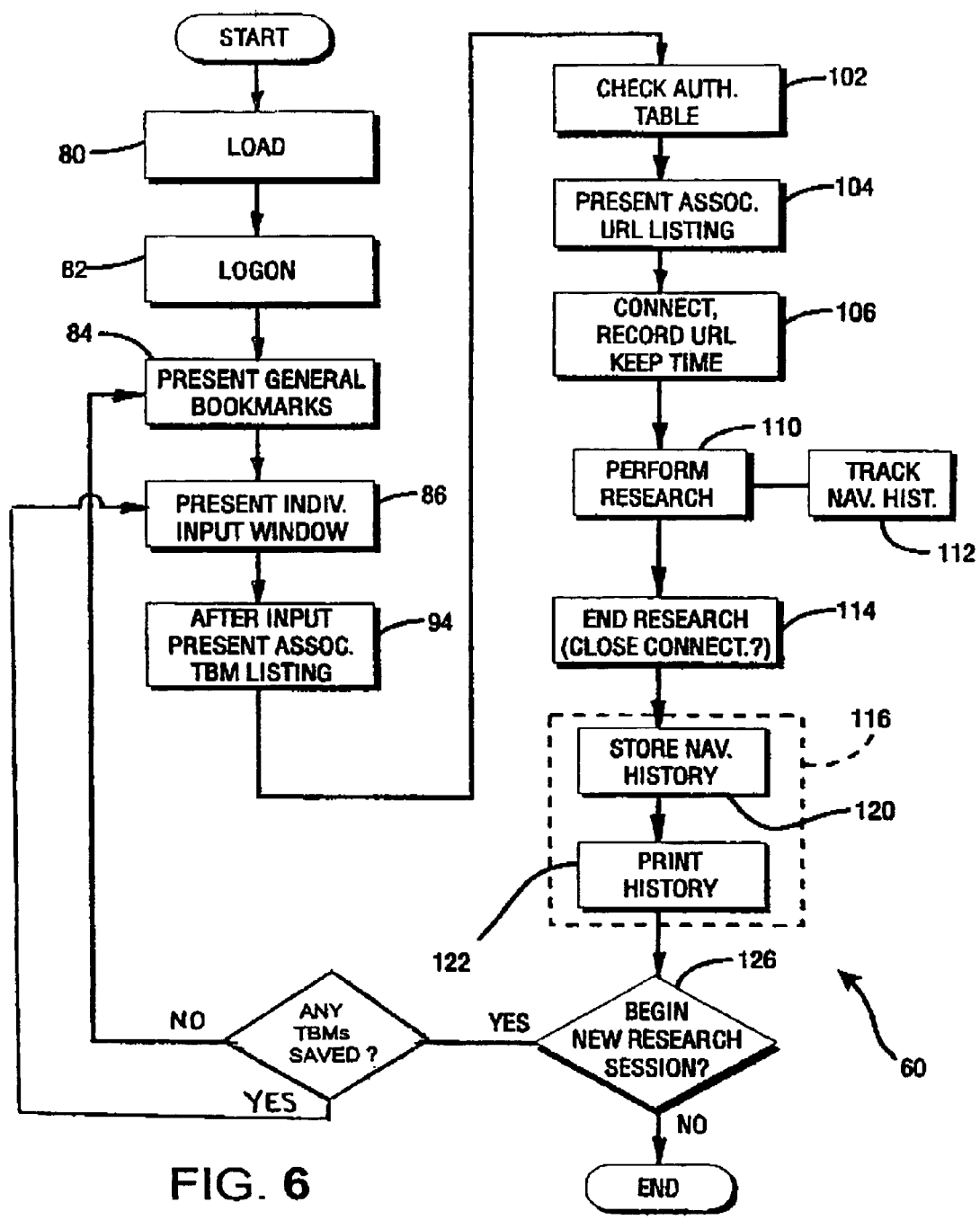
FIG. 6 is a flow chart of the method of the invention.

Referring now to FIG. 6, a flow chart of the browsing method 60 of the present invention is shown. The method 60 is implementable on the Intranet 25 or a standalone PC 22. Where, in an intranet context, <<other users>>refers to either other users of the standalone PC 22 or other users of the intranet who use the method for collaborative browsing, and the term<<network administrator>>is interchangeable herein with the term<<guardian>>(a supervisor such as a manager or a parent in the event that the system is used at least in part for censorship purposes), as the case may be.

The browsing method 60 is encoded on a computer-readable medium. The method 60 is implemented in software which instructs a microprocessor to manage system components, inputs and outputs in a manner which controls access to the Internet. The method 60 includes an access control matrix having at least the parameter of project name 100 which must be input in order for access to the Internet to be permitted. When a data string associated with this parameter is received, the data string is classified and filtered against the access control matrix. If the data string includes a string identified as a project name 100, access is permitted; otherwise, access is limited (e.g., only a limited number of preapproved web pages may be accessed, such as a page providing instructions on how to use the method) or denied altogether. It is also beneficial to include as required parameters a user name 90 and a password 92, in order to be able to measure and compare user performance in Internet research.

In a first step 80, by clicking on an icon for example on the user's desktop, the browsing method 60, operating on the system 20 of the invention, is loaded into the working directory of the computer 22.

In a second step 82, the method then presents an input window (similar to that shown in FIG. 7) in which the user inputs an individual user name 90 and an individual user password 92 (if the system is configured for multi-user access, this may be omitted if only one user is permitted to access the PC). If this information is correctly input, the user then logged on to a PC-resident HTML page. This page includes links to subpages and to other pages on the Internet, preferably on a subject related to the target market of the software (for example, legal links would be provided if the software is customized for the legal market).

In a third step 84, upon clicking on a drop-down menu item entitled "begin new project", the method 60, using the display device 24 of the computer 22, then presents the user with a selectable presentation of frequently used bookmarks or URLs. Optionally, entire contents of web pages may be saved in memory, to aid in off-line research. If another drop-down menu item, entitled "Begin Session" is selected, the method 60 goes to step 86.

Figure 7:
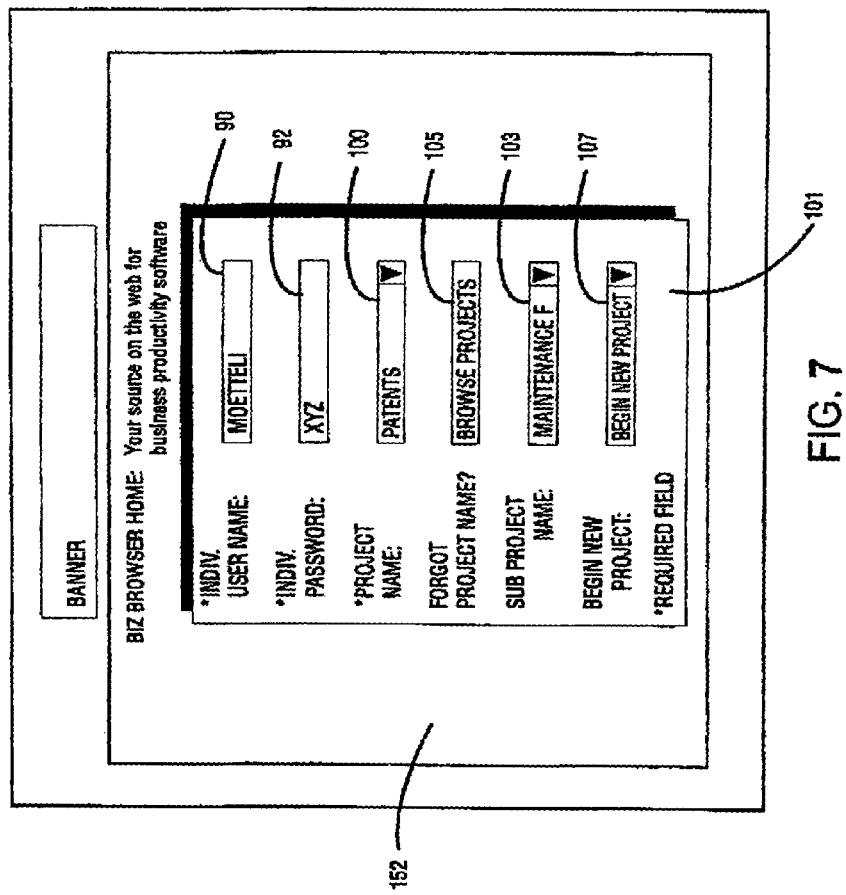
FIG. 7 is a plan view of a login window used in the invention.

Referring now to FIG. 7, optionally, the method 60 presents a single input window 101 in which the individual user name 90, the individual user password 92, the project name 100, and, optionally, subproject name 103 (e.g., for project name "TELEPHONE", the subproject name might be "LONG DISTANCE PROVIDERS") are input. If all required fields are completed correctly, then the method jumps to step 102. Further, finding aids such as a browse project name button 105 may be added, should the user not know the name. Clicking on the "browse project name" button 105 calls up a listing of project names 100, possibly alphabetically listed, from which the user, using the cursor 156, may activate and choose by clicking, or to compare his project name 100 with, to determine whether he made an error in recording the project name. Research results associated with any subproject names 103 are stored in association with their root project name 100. Further, a begin new project button 107 returns the program to third step 84, above.

In this manner, access to the ordinary user is permitted only upon identification of the user and the project with which the research is associated, thus defining a current research project. More importantly, the ensuing online activity, whether on a proprietary server or on the public Internet, is attributable to this individual user name 90 and project name 100.

In the fourth step 86, if one of these links is selected or if this URL listing is bypassed (by, for example, declining its use via a check box or other input device and directly inputting a URL into the location field 176) and if the user did not already create a new project name 100' by searching and merging URLs (in which case, the project name 100' is input automatically as the project name 100), the method 60 presents the user with an input window (such as window 101 of FIG. 7) in which the user must input an individual project name 100, such as PERSONAL or CLIENT 082361. After the user transmits the entered information, the method 60 compares the input name 100 with each name in an approved project name table stored in computer memory. If the input project name 100 does not match a previously saved project name, the user is prompted to verify that this is a new project and to input a description of the project (optional) to be used, for example, in providing a basis for key word search associated with a modified third step 84, described in detail below. To further insure that a new project name 100 is not entered incorrectly and/or to ensure that any research project be attributed to a pre-approved research subject (such as PERSONAL, or TELEPHONE, or BUSINESS RESEARCH), the method declines access to the Internet unless the input project name matches an existing listing of pre-approved project names including such generic project names mentioned above which are stored in a relational database management system running a relational database 53.

In a fifth step 94, after the user has input the required information, he is then presented with any associated (with the project name 100 and the user name 90) TBM Listings (in HTML format and described in detail below in association with FIG. 11) from which he can initiate a new search.

Optionally, the user clicks on button 101 which e-mails the TBM listing to an e-mail address designated by the user (such as his personal address), for later use. The clicking opens an e-mail addressed to a pre-selected address, and includes the URLs of the TBM Listing, either as an attachment or in the body of the e-mail. It should be noted that the research summary or global navigational history shown in FIG. 10 can also be saved as an attachment in an importable form and e-mailed to a third party. If the third party has a compatible browser, the third party may import this data and use it to launch their own research.

Now referring to FIG. 8, in a sixth step 102, particularly where multi-user access is permitted on a standalone PC or an intranet, the individual user name 90 and project name 100 are checked against permissions or AccessTokens in an authorization table (Table 1 of FIG. 8) stored in the relational database 53, to determine whether or not that particular user is permitted to work on the named project 100 and if so, whether the restrictions on use apply (a guardian or system administrator determines the limitations which apply to a given user or project: only he may change these restrictions, as directed by company management for example). If there are no applicable restrictions indicated in the authorization table, the user is permitted to continue. If there are, the user receives an error message informing him that he is not authorized, is given the opportunity to end the session, begin another project, or browse project names 100. Such a means of limiting access to research results will be particularly important in a litigation firm context, where a Chinese wall has been set up between one litigator and another, due to a potential conflict of interest and in the context of posting and accessing confidential documents on a publicly available server 54 (described in more detail below). If there are no applicable restrictions indicated in the authorization table, the user is permitted to continue. Further, users themselves may restrict access (in so far as the system administrator permits them to do so by for example, responding to an e-mail request to modify the user authorization table) to project names which they themselves created.

Further, the user (or the system administrator) can limit access to such projects (over which they have control) to categories/groups of other users, such as management, staff, secretarial, attorneys, paralegals, etc. For example, the user accomplishes this by checking off a dialog box when the user logs off the current project name 100 as shown in FIG. 9. A log off window (not shown) is presented to the user when the user activates a log off feature (such as a pull-down menu, an icon, or answering appropriately to a dialog window presented, asking if the user wishes to continue or terminate the current research project). An optional window 157 is then presented, which includes, for example, the text "permit access to the following categories: [ ] all: [ ] administration, [ ] lawyers, [ ] staff. Checking off any box will limit access to the extent of the user category. In other words, the user will generally have the authority to limit access to anyone in the same category, or of a category which plays a support role in relation to the user. However, certain categories of users ("privileged users") will always have access to research results, such as the system administrator or the responsible attorney in charge of a particular client, or the employee's direct supervisor. When a privileged user seeks access to a particular research result associated with the project name 100, the method 60 accesses the database 53 (described in detail above in connection with FIG. 5) and checks the user authorization table to determine whether the privileged user is the supervisor of the user who performed the research, or whether he is categorized in a privileged level with respect to the user whose research results are sought. If so, the user is granted access, unless otherwise denied by the system administrator (such as in the case of a Chinese wall).

Referring now to Table 2 of FIG. 10, in a seventh step 104, if a previously saved URL Listing, Navigation History or Research Summary exists in association with the project name 100, the user is presented with the associated URL Listing, including all URLs saved in association with the project name 100, or SessionMarks created in a research summary/navigation history associated with the project name (again, see Table 2 and FIG. 5). This summary shown in FIG. 10 may be recalled and brought to top of the user's screen at any time during the research session by simply clicking on, for example, a special icon on the field 154 of the GUI 34 (shown in FIG. 13). In an eighth step 106, upon the input of a user command ordering the downloading of information located on the Internet (such as by clicking on a hypertext link), the log on to the Internet is made (wherein the user name and password for access to the ISP is input), an HTTP connection 72 to a desired server 54 is established, a time T1 is read from the system clock and stored in RAM, a buffer memory or a cache, and the URL is checked against the global navigation history, including the GlobalMarks 228 associated with the project name 100 to see whether the URL is being accessed for the first time. If so, the URL is added to the listing and the user name 90 is listed in Col. 6 of Table 2 as the pioneer user associated with the URL link. The number "1" is attributed to the counter associated with this URL. Otherwise, the counter associated with this URL is incremented and the number stored in Col. 5 of Table 2. In a ninth step 110, the user is provided with the opportunity and means to perform his research. In a tenth step 112, concurrently with the research, the navigation path of the research is tracked and stored by any number of suitable methods, such as that described in U.S. Pat. Nos. 5,717,860 and 5,712,979, the contents of which are incorporated herein by reference. The system clock is read at each change in URL and the time TN of the change noted, in order that a time TURL [=(T−T$_n$)] may be associated with each URL, indicating the amount of time the user spent at that URL, which is then recorded in Col. 5 of the<<Research Summary>>of Table 2 of FIG. 10. Further, routinely, all URLs are checked against those in the global navigation history associated with the project name 100 and when accessed for the first time, the user name 90 is added to Col. 6 of the <<Global Navigation History>>in Table 2, in association with the URL, and the counter initialized. If the URL is not accessed for the first time, the associated counter is incremented.

In a special feature, the downloading of web pages is indicated by a light icon (not shown) which flashes by changing color between red and green during downloading. Each web page associated with the project name 100 may have keywords or comments stored in association with it. These comments or keywords are input by a user upon the creation of a new project and are stored in a corresponding relational database field in association with the project name 100. A scan submethod scans the text of each downloaded page for words which match these keywords or comments. If a match is found, the submethod changes the color of the light icon from red to green and stops its flashing. Thus the user can quickly see whether the downloaded page is not relevant to the project name 100 while at the same time receiving an indication that online activity is underway.

In an eleventh step 114, the user ends his research session. The total time TT, spent on researching the project name 100 is calculated using conventional methods and is recorded in the research summary section of Table 2. Here, the user may close the connection or indicate that a new research session should begin. If the user chooses to end the research, this begins the logout process 116 which includes a twelfth optional step 120 and a thirteenth step 122. At this point, optionally, the user may display the research summary, and edit the bookmarks which he added during the session. He may also mark any sites which are attributable to him (as the pioneer user) either in the global navigation history or the research summary, for deletion, but he may not delete them himself (unless he is the system administrator). The marking tags these records in the file in which is then stored in memory, for easy retrieval by the system administrator or guardian upon scanning the memory for such marked records.

Further, such marking for deletion moves the bookmarks or URLs off of the Research Summary and/or the Project Global Navigation History (see Table 2) page and onto a page which is hypertext linked (via a link entitled "Marked for Deletion" for example) to the page on which the summary and navigation history are listed. In this manner, when the Research summary or report as laid out in Table 2 is printed, any links which are marked for deletion are not printed, thus permitting the placement of the summary in a client's file without including any potentially embarrassing or unprofessional information thereon (a "marked for deletion" notation on the print out makes sense because the deletion of sites which are not of interest to a client is an administrative task). Further, the system administrator (or guardian) may then delete these marked records, and adjust the user authorization table appropriately (e.g., if the system administrator finds that a user has marked for deletion a series of sites that fit a particular category to which the system administer may block access in the user authorization table, he may so adjust the user authorization table in order to prevent this content from being accessible to the user.

In the twelfth step 120, the research summary of the session (Table 2, Section 3) is saved in the database 53 for common access and for presentation upon the user's or another privileged user's next login under that project name 100. The research summary includes the individual user name 90, project name 100 and navigation path or history 124 (shown in FIG. 10) of the last research session.

In the thirteenth step 122, the method 60 presents the user with the opportunity to print out the research summary, project navigation history, and/or associated bookmarks, for placing in an associated file for later reference. The printout may simply be that of Table 2 of FIG. 10. For example, the user is presented with an input screen which queries the user as to whether he would like the individual user name 90, project name 100 and navigation history 124 printed out. If the user answers affirmatively, the summary is submitted to a printing cache of a connected printer for printing.

In a fourteenth step 126, the user is queried as to whether he would like to begin another research session and if so, the method 60 returns to step three 84 above, the input window 101 of FIG. 7 (wherein the user name 90 and password 92 are automatically input into the windows, or, if the TBMs were created during the research session, the method returns to step 86 above and the TBM listing is presented, carried over to the next research session. If not, the connection closes, the user is asked whether he wishes to save any TBMs created during the research session. If the user responds in the negative, any unsaved TBMs are automatically deleted and the method 60 ends. If the user responds in the positive, the TBMs are saved in association with the project name 100 for presentation, in a selectable form in chronological order with other TBM listings, next time that step 94 is executed.

In an alternative embodiment to the method 60, the second step 82 and third step 84 may be reversed. Further, referring again to FIG. 6, the third step 84 of presenting frequently used URLs is performed in the following manner. In a first substep 130 of the fourth step 86, the method 60 provides a pull-down menu or a dialog window 137 (such as that shown in FIG. 13), which permits the user to perform a key word search of all descriptions of project names 100 previously searched by others, including any associated or unassociated (i.e., all) bookmarks (by name and by associated description of the bookmark). In a second substep 132, after input is received from the user, any descriptions, project or bookmark names matching the search criteria are presented to the user in a selectable format such as a URL and description listing in the form of a research summary such as that shown in FIG. 10.

Further, to economize display screen space and computer memory, the research summary may include shortcuts to folders of links common to a particular type of research, thus not requiring duplication in each related project research summary and providing easy access to frequently referenced links. These shortcuts may be dragged and dropped into the URL listing in the research summary using, e.g., a project management subroutine controlled by a sub-interface. For example, it is convenient for each project name 100 having to do with patents to have a "patent search" folder of URLs. This folder is actually a hypertext-type link to a single global folder such as that shown in the upper portion of FIG. 10, which might have links of particular interest to patent related projects.

Depending on global system administrator settings, the project names 100 presented may be limited to those which the user is authorized to view and/use, using the user authorization table 1 of FIG. 8. Prior to display, the search results are scanned to identify and automatically delete any duplicate URLs from the project global navigation history or bookmarks. Further, the user may edit the presented listing for saving in association with a project. Alternatively, the user may begin his search using the bookmarks which he has saved for general use, as is the case in the prior art. In a third substep 134, after any editing, the method prompts the user for a project name 100 (and subproject name 101, as the case may be) with which to associate the edited URL listing.

In a fourth substep 136, if a project name is input, the selectable listing is saved in association with project name 100 for later access and the user is prompted to input a project description (to permit key-word searching by project name). Then, when the user inputs a project name 100, the method saves the selectable presentation of matches as the bookmark listing associated with the input new project name 100' and the new individual user name 90. This is done off-line. Then, the submethod returns to the method 60, the fourth step 86. Thus a user who has little knowledge as to how to begin the research session will be able to take advantage of the navigation history and associated bookmarks that others have created on similar projects before accessing the Internet. This saves the user a substantial amount of time by enabling him to benefit from prior similar research performed by others who may have more experience than himself. This saves money as well, as on-line time is minimized. The method 60 further provides the user with an option enabling the user to focus the key word search on only those projects which he has previously worked on, by scanning saved URL listings for his individual user name and presenting only those navigation histories and/or bookmarks associated with these project names 100.

In a modification of the above embodiment, in the first substep 130, the user may search by his or another's user name, and receive all URL listing which he or another user (to the extent of his authorization to receive such information from the other user) in listing form. The method then returns to the third substep 134.

In another embodiment of the method 60, the third step 84 provides the search input field 137 (shown in FIG. 13) and search engine (such as that described in U.S. Pat. No. 5,864,863 to Burrows, U.S. Pat. No. 5,933,822 to Braden-Harder et al. and U.S. Pat. No. to Krellerstein, the contents of which are incorporated herein by reference) together with canned, pre-organized listing of bookmarks which are pre-loaded in the method, after learning of or estimating/projecting the likely needs or requests of the user. The search engine searches the bookmarks using keyword inputs of the user. For instance, if it is determined that the method 60 is to be sold to a litigation firm, bookmarks and sample searchable projects associated with a project name and potentially relevant URLs are added in order to provide the user with an initial off-line listing of research tasks which are commonly performed among such users.

In the case of users working in litigation firms, research tasks such as seeking paralegal service providers, sources of information regarding local or national courts, SEC filing information, private investigation services, corporate address information and officer biographies, telephone or Internet services, computer support services, web page development services, etc., including URLs addressing websites having listings of FAQs and sources of other helpful background information of the user are provided. The pre-packaged bookmark or URL listings are associated with a readily recognizable generic, descriptive project name 100 and project description and generated by experts in the field who have actually performed a typical search. This navigation history generated by these expert searches is pre-packaged in association with generic project names 100. Because bookmarks are saved in association with user name, the user can execute a keyword search constrained to a project name 100 as well as a particular user name 90. This would be particularly useful in large organizations with multiple departments.

In another modification of the method 60 of the invention, using a suitable method such as that described in U.S. Pat. No. 5,826,267, the content of which is incorporated herein by reference, after step 106 of method 60 above, wherein a user using a client computer 22 initiates a request for information and the request for information is interpreted and retrieved, the URL is filtered against a listing of unapproved URLs and, if unapproved, the download is terminated prior to the document being transmitted to the client computer and displayed. Optionally, identifying code of banner advertisements are detected and such advertisements are stripped from the HTML code prior to the CGI reassembling the page for presentation to the user by the browser.

Figure 12:
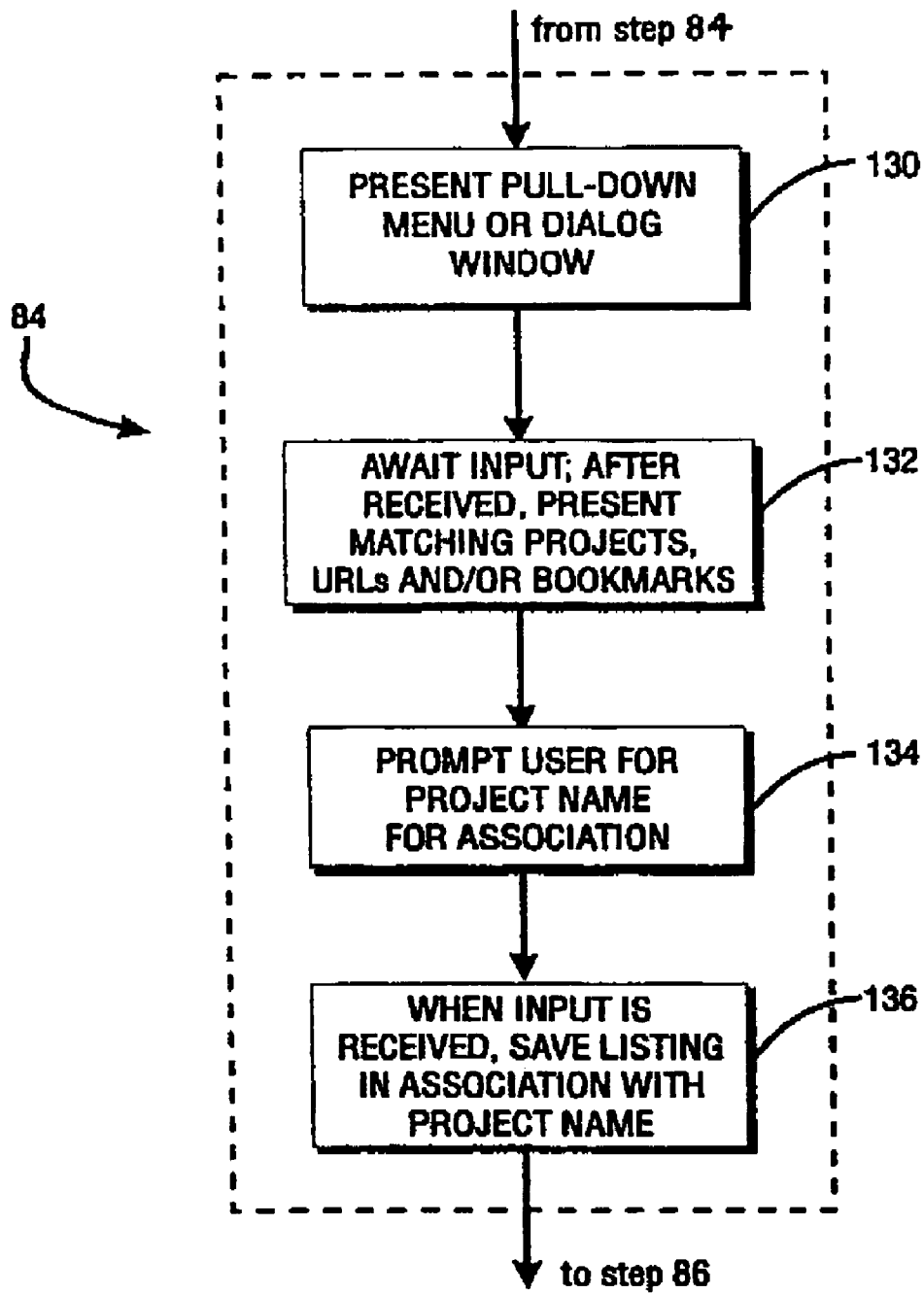
FIG. 12 is a flow chart of an off-line URL organization step of the invention.

FIG. 12 illustrates a GUI layout 150 in which a sample World Wide Web page 152 is displayed in accordance with the method 60 of the present invention. A GUI is a type of display format that enables a user to choose commands, start programs, and see lists of files and other options by pointing to pictorial representations, called "icons", and menu bars and/or buttons 154 allowing the selection of menu items from pull-down lists on the display device. Choices can generally be activated by either a keyboard 26 or a mouse cursor 156. The size and position of elevator 160 within scroll bar 162 corresponds to the size and position of the current viewable page in relation to the document displayed within window 164.

In the example window 164 depicted, because sample web page 152 includes too many pages to view simultaneously, the user can position the mouse cursor 156 over the arrow section 166 or arrow section 170 of scroll bar 162 and click a pointing device (e.g., the mouse 27) to scroll the document upward or downward, as appropriate. Scrolling in this manner permits viewing of any desired portion of the document. Arrow sections 172 and 174 allow a user to scroll respectively left or right. Window 174 is a location field indicating the current URL address. The location can be changed by manually entering a URL into field 174 or selecting a URL from a pull-down navigation history 124 as in the prior art. A hypertext link 180 permits navigation between the current page 152 and the page referenced by a URL address associated with the link, discussed in more detail below. Window 182 includes the description of the page 152, taken from the corresponding tag of the page itself. A window 154 indicates the current amount of time on-line for the current project 100. Optionally, the GUI 150 may have a banner display field 184 where display advertisements may be presented, preferably screened or filtered by a suitable method such as described in U.S. Pat. No. 5,826,267 so as to present only approved advertising banners which may be selected based on their relevance to the research goals of the project.

The links 180 point to Internet services which are typically accessed by specifying a unique address or URL which is associated with the link. URLs can point to numerous resources on the Internet, including HTML documents, pictures, sound files, movie files, or database search engines including specific search queries. URLs can point to resources located on the client computer 22, or anywhere on the Internet. They can be accessed either through an HTTP server or another Internet server running on top of TCP/IP. The URL may also direct the server computer to run another gateway program and return the result to the client computer 22.

The URL has two basic components, the protocol to be used and the object path name. For example, the URL "http://uspatentinfo.com" specifies a HTTP and a pathname of the server hosting http://uspatentinfo.com. The server name is associated with a unique numeric value (TCP/IP address).

Figure 13:
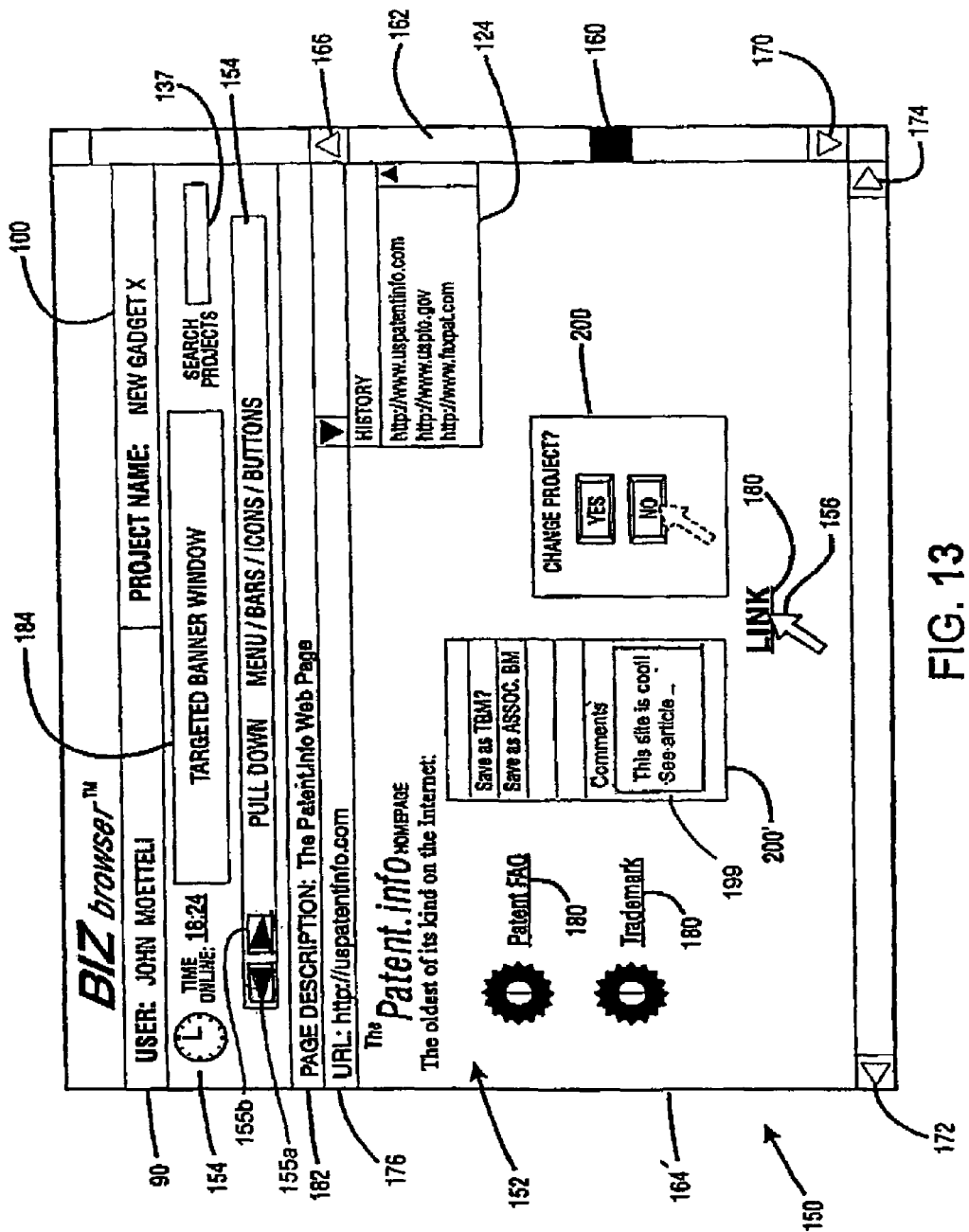
FIG. 13 is a Graphical User Interface ("GUI") of the invention.

In the example depicted in FIG. 13, the "PATENT. INFO" home page includes links 180 which are typically underlined or highlighted to indicate the presence of a URL address link. Using a prior art browser, if a user wishes to go to the linked page, the user places cursor pointer 156 with a mouse 27 or other pointing device over the link 180 and activates the pointing device to access the linked page or document.

The hypertext links 180 are important because they facilitate access to web pages over the vast network of the World Wide Web. HTML commands, called "tags", mark text as headings, paragraphs, lists, quotations, emphasized, and other formatting information. HTML also has tags for including images within the document being read to other documents, fill-in forms 70 (see FIG. 4) that accept user input, and hypertext links 136 connecting documents being read to other documents or Internet resources such as FTP sites, WAIS databases, USENET news, e-mail, gopher sites, or another HTML document.

This feature allows the user to click on a string of highlighted text and access a new document, an image, or a sound file from a computer within the network anywhere in the world. The element marking a hypertext link 180 in a HTML document is referred to as an "anchor" or "element" and the marked text is referred to as a "hypertext anchor" or "anchor tag". The anchor tag has a destination portion and a text portion. Furthermore, the anchor tag is delimited at the beginning by an "<A>" and at the end by an "</A>" character sequence. The destination portion contains an entry which indicates the location of the destination web page. The text portion is the text which appears on the GUI 150 and is associated with the hypertext link 180. For example, consider a hypertext link 180 having the following HTML anchor tag: <A HREF=http://uspatentinfo.com> The Patent. Info Home Page</A>.

The destination portion of this tag is "http://uspatentinfo.com" (shown in field 176 of FIG. 13). The text "The Patent. Info Home Page" (shown in field 182 in FIG. 13) occupies the text portion of the HTML based link. A web page contains a list of anchor tags which describe hypertext links in HTML. The browsing method 60 of the present invention processes these anchor tags and displays corresponding hypertext links 180 to the user on the display device 24. An anchor tag can be modified such as to prevent access to an associated site, as described in U.S. Pat. No. 5,826,267.

In addition, there are numerous links tags in HTML to enable the viewer of the document to jump to another place in the same document, to jump to the top of another document, to jump to a specific place in another document, or to create an jump to a remote link (i.e., via a URL) to another server. Links 180 are typically displayed on a web page in color or with an underscore or both. In response to the user pointing and clicking on the link 180, the link is said to be "activated" to begin to download of the linked document or text.

Figure 14A:
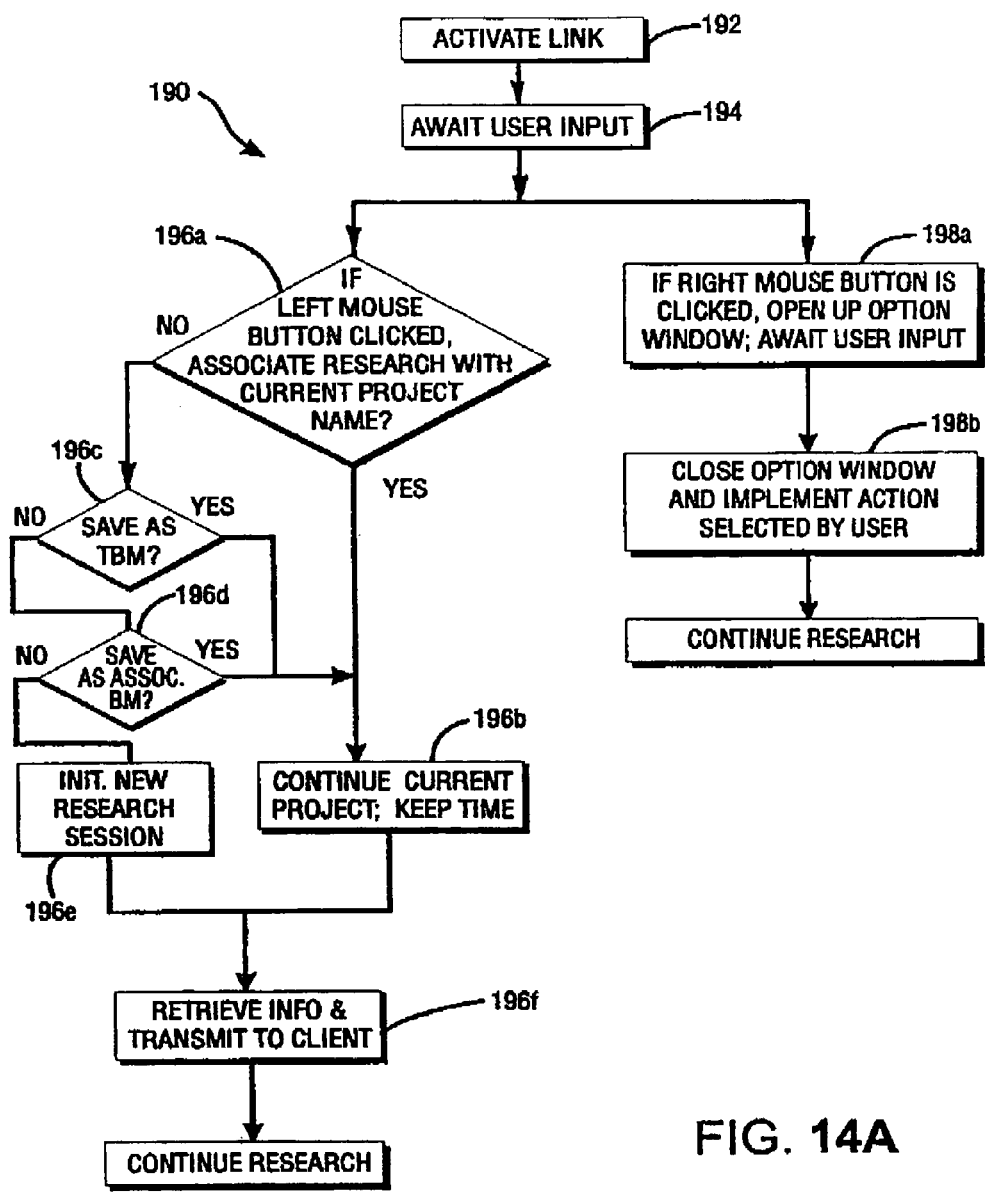
FIG. 14A is a flow chart of a submethod of the invention which executes upon activation of a link.

Referring now to FIG. 14A in which a flow chart of a submethod 190 of the method 60 is shown, the submethod runs during step 110 of the method. The user is provided with a means of choosing this option, via a drop-down menu with a "set options" selection. The submethod 190 modifies the method of the prior art of selecting hypertext in which pressing the left mouse button 28 while the cursor 156 is over a link 180 initiates the downloading of the linked document (i.e., by clicking on a hypertext anchor normally displayed as a hypertext link 180 within a hypertext document displayed on a client computer's display 24) and clicking on the right mouse button 29 provides the user with a menu of actions to choose from.

In a first substep 192, the user places the cursor 156 over the hypertext 180 of interest, thereby activating the link.

In a second step 194, the user decides whether to click on the left mouse button 28 or the right mouse button 29.

In another substep 196a, if the user clicks once on the hypertext anchor using the left mouse button 28 (or analogous action), the submethod 190 reminds the user of the current project name 100 and solicits the user's confirmation that the research sortie or session, which the user indicated he wished to initiate by his clicking on the link 180, is to be associated with the current project name or a new project name 100' (i.e., window 200, shown in FIG. 13, is presented). Further, substep 196a of the submethod 190 solicits the user's comments or review of the contents of the currently downloaded page via a clearly marked input field 199 in the window 200'. These comments, whether they be text or a sound file (such as a. wav file), are saved in a designated search field for a search routine that enables searching by key word or for reference to aid in determining whether the associated web site may be of interest to the user.

In substep 196b, if the user confirms association with the current research name 100, the submethod 190 continues research by retrieving the information and transmitting it to the client computer 22. The time TN is then stored in a buffer and the URL is stored in the navigation history file.

Confirmation of the association may be solicited in a number of ways. In one embodiment, the submethod 190 activates and displays an input or secondary window 160 (shown in FIG. 13) which prompts the user to press an icon or other button using the mouse cursor 156 to confirm that the project name 100 is not to be changed. If the user confirms by, for example, clicking "yes", the research session is associated with the current project name 100, and as stated of substep 196b, the submethod 190 continues.

In substep 196c, if the user clicks "no", the submethod 190 queries the user to determine whether he wishes to create a TBM, thus allowing the user to temporarily save the URL for later access and continue with the current research project. If the user so desires, by responding in the affirmative, then the TBM is saved and the step goes directly to substep 196b and the research continues.

In substep 196d, alternatively or together with the TBM feature, the user may use the associated bookmark feature.

Thus, in substep 196d, if the user responds in the negative, the user is asked whether he wishes to save the URL in association with another project name 100' (as an "Associated Bookmark") and if so, the user inputs the project name 100', a description (optional), and the URL is stored in the URL Listing in association with the project name indicated, optionally highlighted or italicized (see Table 2, under Associated Bookmarks: "SEC FAQ") to indicate that that URL has not yet been accessed and permitting identification of the URL during a later research session. The user's individual user name 90 may optionally be associated with this as well, to permit easy identification. Provided that the user was the first to create this Associated Bookmark (as indicated in the second column of the Associated Bookmark section of Table 2), permits temporary and editable storage of the bookmark to the potentially irrelevant site (with respect to the current project 100) in association with his "personal" or another project name 100. In this way, the user is provided with freedom to navigate to potentially irrelevant sites.

In substep 196e, if the user indicates "no" once again, a new research session 100' is initiated and associated with the new project name 100'. Thus, in this substep 196e, the user must input the new project name 100'. After the project name 100' is input, the system clock is read and the time TN is used to calculate the total time on the prior project name 100 and to initialize the clock to commence tracking the time on the new project name 100', using methods well known in the art.

Then, in substep 196f, the submethod 190 retrieves the requested information and transmits it to the client computer 22, where the HTML is compiled into a hypertext document and displayed. When a new URL is used and the associated site is accessed, the user name 90 of the first user to access a site listed on the navigation history (the "pioneer user" indicated in Table 2) is associated with the navigation history, permanently stored in the URL listing in association with the project name. The URLs in the navigation history cannot be deleted by the user—only the system administrator or guardian or other privileged user can do this. Then, if the user/employee actually visits a site unrelated to the current project name 100, he must reflect upon the fact that his individual user name 90 will be associated with the URL on the permanent navigation history listing which is either available for presentation to all who perform research under this project name 100 in the future, a supervisor, or at least the system administrator (as determined by the system administrator). If the irrelevant URL is to be erased, the user must request this of the System administrator or guardian. This feature, in and of itself, acting as a deterrent to irrelevant research.

In substep 198a, if the user clicks the right mouse button (or analogous input), an option window 200' (shown in FIG. 15) opens and the submethod 190 awaits user input. Note that the two windows 200 and 200' are not displayed at the same time—however, they are shown in the FIG. 13 together for the sake of thoroughness and to simplify the drawings.

In substep 198b, after input from user is received, the option window 200' is closed and the selected action is implemented. If the option selected was the creation of a TBM, the user has saved the URL for later access, without downloading it (and thus having it stored in association with the project name 100). The URL is then stored in an editable, at least semi-private format (i.e., not accessible by all, rather only by certain privileged users, if any) for later access. Thus, the method 60 provides the user with an additional incentive not to access a page which is of private interest and/or not relevant to the current project 100 (to avoid an improper association). By providing a user with this way to store URLs which are irrelevant to the project at hand or of personal interest by postponing access and properly associating such access with the correct project name 100, the user is likely to remain focused on the current project 100. This decreases the likelihood that irrelevant sites will be found on the navigation history associated with the project name 100. Thus, the method 60 of the invention allows users to surf the sites of their choosing, while directing them to focus their research one project at a time.

In a Java-based web browser, such as is the present invention, the secondary or "target" window 200 may include comment buttons, check boxes, list boxes, drop-down list boxes. It is commonly known in the art that web authors can set up such a link so that when a user clicks on it, an input window such as window 200 appears.

Figure 15:
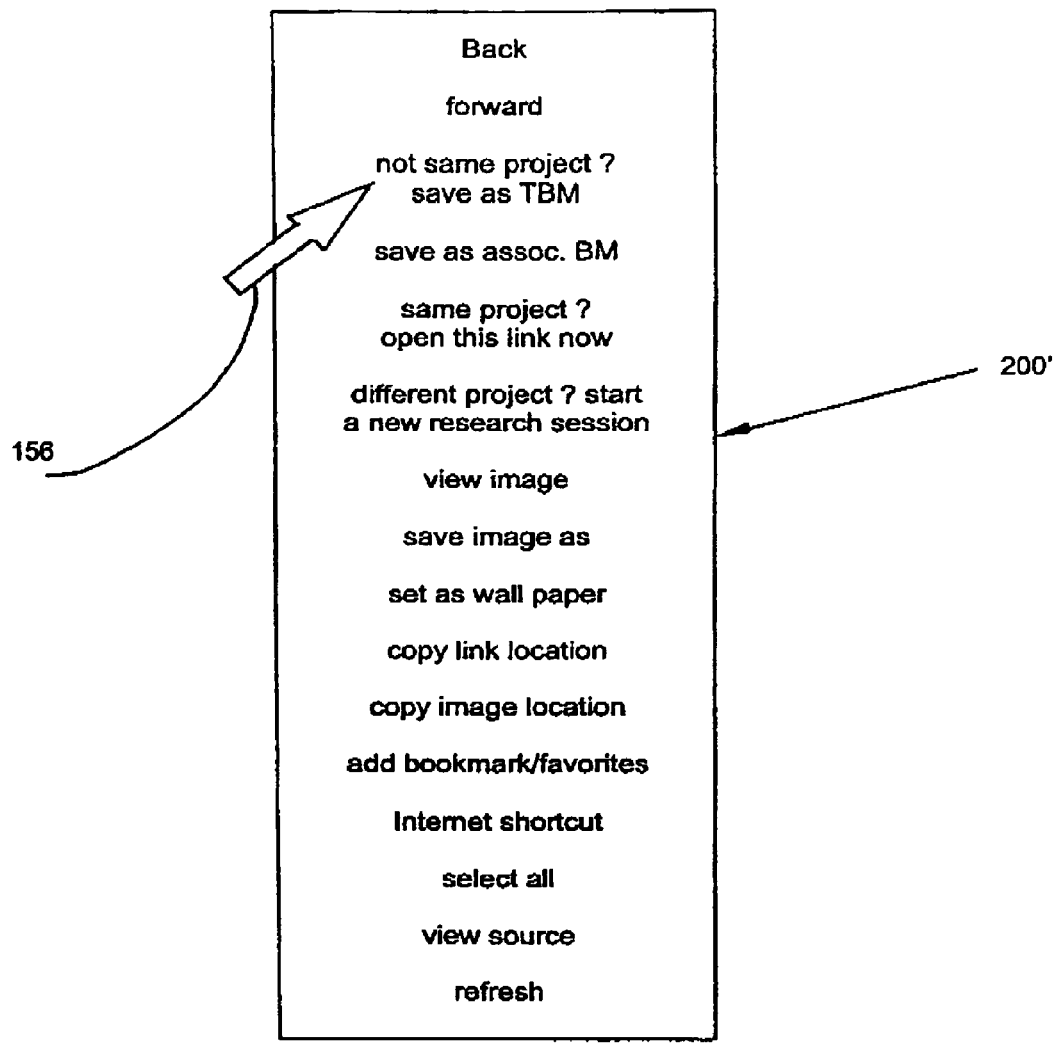
FIG. 15 is a secondary window of the invention.

Referring now to FIGS. 13 and 15, the input window 200', used in association with the submethod 190, is shown to include other menu items such as those presented in the prior art when the right mouse button 29 (or equivalent) is pressed. There are a variety of options to select from on this option window 200'. The options listed in this option window 200' include, for example, "back", "forward", "open this link", "open in a new window", "view image", "save image as", "set as wallpaper", "copy link location", "copy image location", "save as a TBM", "add bookmark" (clicking this option adds bookmark to bookmark listing common to all projects), "save as Associated (with current or another project name) Bookmark", "Internet shortcut", "select all", "add to favorites", "view source", "refresh", and "properties", among others.

In a modification of the first substep 196a (shown in FIG. 14A), when the user clicks on the link 180, the submethod 190 first determines whether the web page selected is a subpage of the current page, is a jump link, or includes the same root URL as the current web page before presenting the user with the input window 200. This identification is performed using conventional methods known in the art. If the page selected is a subpage of the current page, a jump link, or is included under the same root URL, the substep 196a skips to substep 196f without a query being initiated. In this way, only those hypertext links leading to a web page that is likely to have different content are subject to confirmation that they are to be associated with the same project name 100.

Figure 14B:
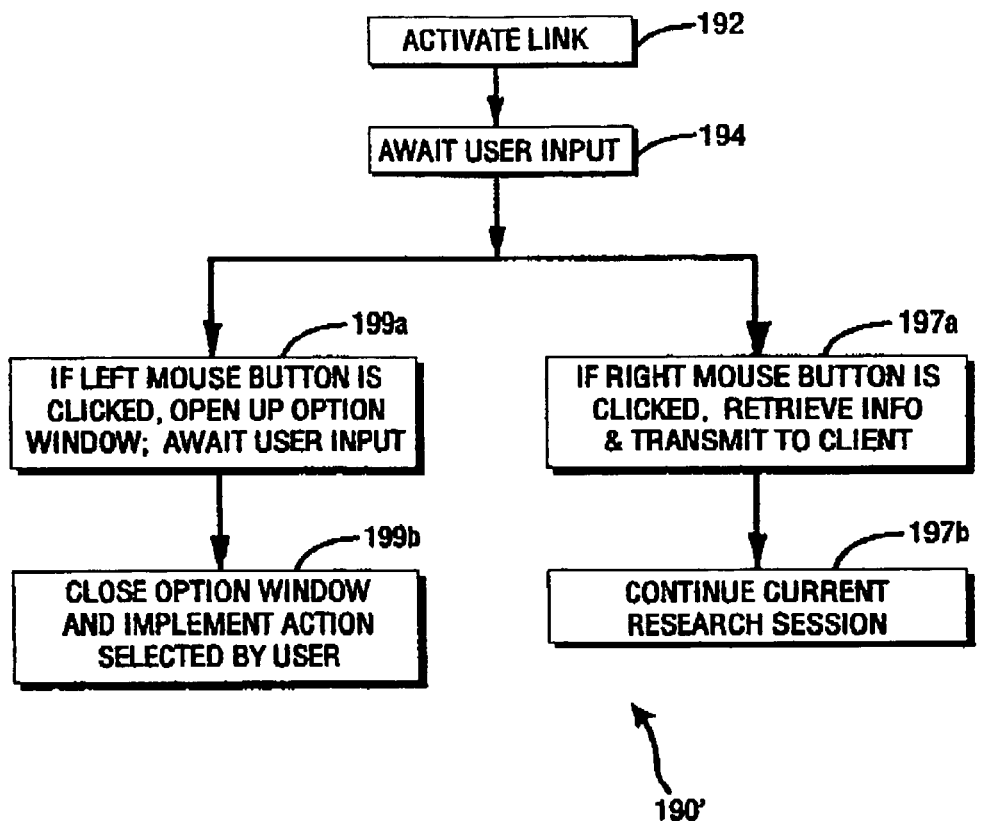
FIG. 14B is a flow chart of an alternate submethod to that shown in FIG. 14A.

In submethod 190', an alternate embodiment of the submethod 190, shown in FIG. 14B, the option window 200' is not displayed and the substeps 196a through the 198a are replaced with a substeps 197a, 197b, and 199a and 199b.

In the substep 197a, when the right mouse button is clicked, the method 60 immediately accesses and transmits the requested information, just as with a left button click in the prior art. The use of the opposite mouse button of that used in the prior art and therefore nonordinary, a conscious deviation from the expected, thus acknowledges that the research is to be attributed to the same project name 100.

In substep 197b, the research is continued.

In this embodiment, in substep 199a, if the left mouse button is clicked, the option window 200' (as shown in FIG. 15) is displayed and the submethod 190' awaits user input.

In substep 199b, when the user input is received, the option window 200' is closed and the selected action is executed.

By changing the means of activating anchor tags from that to which most users have become accustomed, in order to bypass the input window 200 (requiring confirmation that the same research session is to be continued), the user is reminded of the need to correctly associate the research session with the project name 100. Thus, upon selection of a link preferably by doing so in an non-ordinary fashion (or otherwise by answering a query), the user indicates his consent that the research session initiated will be associated with the same project name 100, and permanently saved in the global navigation history (see Table 2) associated with the project name 100. This permits the user to go directly to the page selected.

In another embodiment of the submethod 190, it is possible to obtain the same visual result seen by the user by several alternate means. For example, after reception and during the compiling of a HTML document, the browser method 60 places an information "object" within each anchor tag of the page being formatted for display. This information object is saved to a separate file or cache within the client computer 22. Multiple information objects may be associated with a single link. Further, the information object need not be related to the link to which it is associated. Those skilled in the art will recognize that other HTML commands and tags, such as a tag dedicated to masking an information object within the currently displayed page, may be used. The input windows 200 and 200' represent examples of a type of information object. In this manner, the input windows 200 or 200' may be formatted and displayed upon activation of a link in a web page being displayed. Thus the input window 200 is displayed in this manner whenever a call to a web page is made by clicking on a hypertext link 180, such as when a search to a particular URL is initiated or when a previously stored URL is launched (such as from the TBM listing of Table 3, or associated bookmarks, navigation history and research summary of Table 2). Further, the input window 200 may be an HTML "fill-in" form (such as that shown in FIG. 7) that is retained on the display screen and may be filled with information that the browser can then deliver back to a network administrator (where access to the Internet is made via a firewall of an local area network) or guardian (a supervisory user where, for example, the computer is standalone) after the research session is completed. Note that the window 200 reminds the user of the current project name 100 and asks the user if he would like to continue with the same project or change the project name.

In an alternate embodiment of the submethod 190, preferably configurable by the user by making menu selections from a drop down "settings" menu, the user may change setting such that he can review a page in one of several different modes. In a first mode, the user can review a web page without having to attribute it to a project name 100 until he has finished reviewing the page. The fact that the user is ready to provide comments regarding a page is indicated by his having activated an anchor tag or URL pointing the browser to another web page which is not a subdomain of the current page, the latter restriction limiting the querying to queries at the most relevant times, i.e., when the content viewed by the user is likely to change significantly. In this mode, the user may still be queried as to whether the URL associated with an activated anchor tag should be saved as a TBM, in lieu of downloading the selected data at the URL. However, the user is not asked whether the downloaded data is to be associated with the current project name 100 or a new project name 100' until the user has had a chance to review the information downloaded. Further, in this embodiment, the variations regarding clicking on the right or left mouse button are available as a user moves away from an already reviewed site. Therefore, in an equivalent to the input window 200 or 200', another menu option, namely, "input keywords and/or comments" 199, is presented to the user, to provide the method 60 the opportunity to capture the user's contemporaneous comments, whether in text or a sound file, regarding the site just visited.

The substitute for substep 196a is identical except that when a user activates a link 180, he's indicating his desire to leave the currently downloaded site and is asked to associate the site he's already visited with a project name 100. For example, if the user clicks once on the hypertext anchor using the left mouse button 28 (or analogous action), this alternate embodiment of the submethod 190 reminds the user of the current project name 100 and solicits the user's confirmation that the research sortie or session, which the user had previously initiated, is to be associated with the current project name or a new project name 100' (i.e., window 200, shown in FIG. 13, is presented). This embodiment, although less controlling of navigation, is more appropriate for simply tracking and soliciting, receiving and storing comments, such as key words, metatags, or descriptive terms regarding site content for use in identifying the site when the search feature presented in the dialog window 137 is used.

In another mode, the user can change setting so that no dialog window is presented upon activating a link, but rather the window only appears when the user clicks on the right mouse button. In this mode, the URLs of downloaded pages are automatically associated with the current project name 100.

A system administrator, by evaluating the focus quotient Q across different users under differing conditions, may find that it is better, once a project name 100 is selected, to automatically associate all downloaded pages with this project name, without querying the user. If the user knows that, when he downloads a page, it will necessarily be saved in association with the current project name 100 until he otherwise logs out of the current project name, then, when the user sees something of personal interest, he will save it as a TBM or start a new research session under his PERSONAL project name. However, this would not eliminate the need to have a dialog window 200, as the option of saving as a TBM and inputting keywords or comments with respect to the page just visited would be important.

It should be noted that as users navigate the web, there will be potentially hundreds of URL saved in association with a project name 100. Many of these URLs will have little value, primarily taking up disk space. Therefore, in an optional submethod, after a predetermined time period, all URLs associated with a project name 100 are automatically deleted (1) when they are not pre-packaged URLs (i.e., pre-stored in the database with which the method is provided when purchased) or otherwise useful across projects, and (2) the user has made no comment or input no keyword regarding the site, i.e., where there is no comment or keyword saved in association with the project name 100. In order to accomplish the foregoing, the submethod therefore performs the following steps. In a first substep, a URL is saved as part of a navigational history data listing, together with a time tag. In a second substep, the submethod scans the time tags in the data listing and marks all URLs in the listing that are of a predetermined age.

In a third substep, the submethod checks the comment field in the data structure of each marked URL. In a fourth substep, if this field is empty, the submethod deletes the marked URL.

Having this automatic deletion feature will enable the method 60 to automatically record URLs for each domain or subdomain visited during a research session, without concern that this information will overly tax the memory resources of the computer 22, or annoy the user or the system administrator by requiring too much of their time in identifying and responding to "mark for deletion" requests.

It should be further noted that the method 60 is ideally used to deliver specific content in the form of URLs that are selected, reviewed and indexed according to a hierarchical tree structure such as a directory/subdirectory structure. These trees are generally tailored to the needs of particular professions, such as lawyers, doctors, CPAS, engineers, CFOs, Venture Capitalists, etc. For example, if the method 60 is tailored to the needs of the professional IP purchasing agent, then the tree would have structured links arranged according to project names 100 such as IP exchanges, IP valuation sites, Glossary sites, general IP content sites, sites of licensing professionals, patent searching sites, etc. During the course of a user's research, he will add custom content through his visiting and commenting on sites of interest to a particular project such as subdomains of IP exchanges presenting particular new technologies for sale, etc. Therefore, the method 60 provides a structured means of accessing and navigating the Internet.

Figure 17:
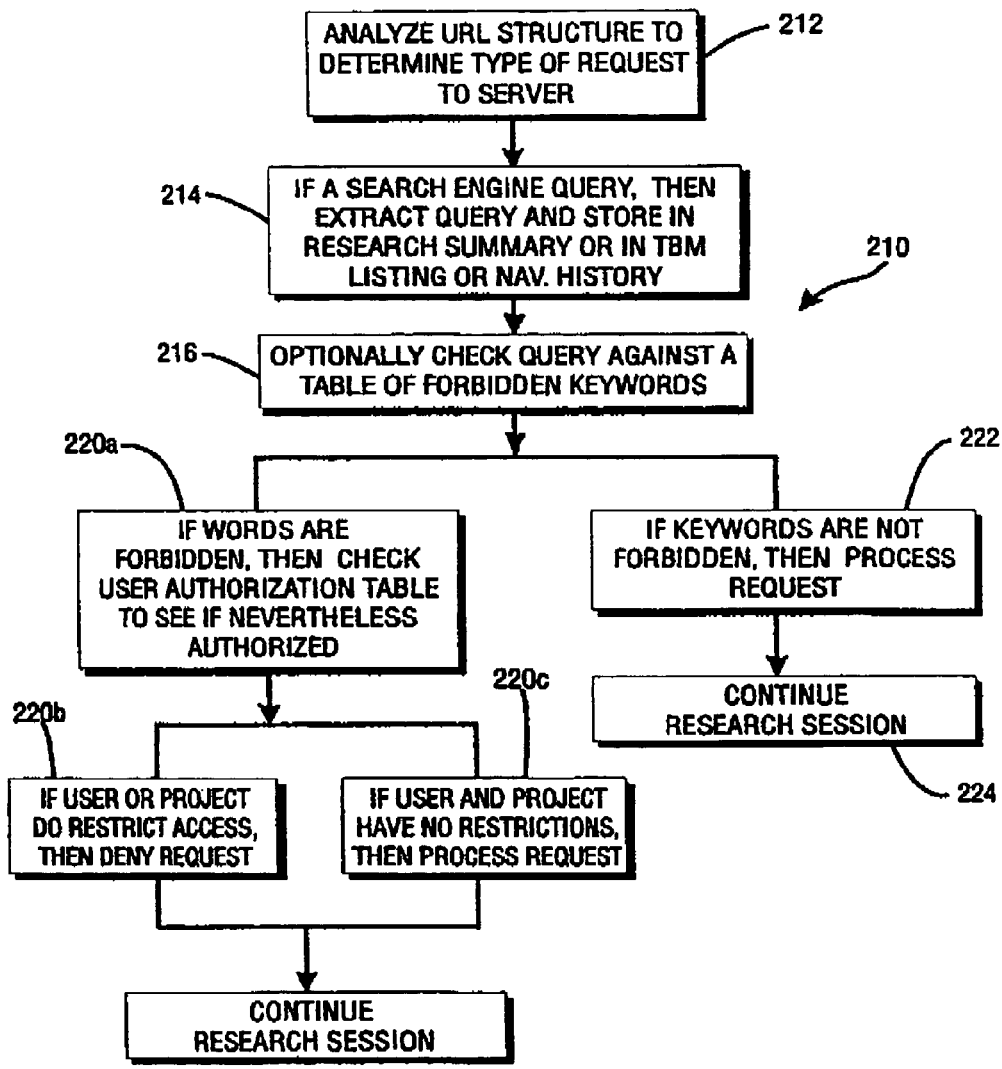
FIG. 17 is a flow diagram of a submethod of the invention.

Referring now to FIG. 17 showing a flow chart for a submethod 210, when a search engine such as "EXCITE", "LYCOS", "INFOSEEK", "HOTBOT" or "SWISS SEARCH" is accessed, the method 60 of the invention handles this as follows. In a first substep 212, the submethod 210 recognizes this fact by analyzing the URL code/structure invoked and, consequently, identifies the site type as a "search engine" in column 2 of Table 3 of FIG. 11. For example, the method 60 may simply check for the word/expression "search=" and/or "=" in the URL string/query, the presence of which indicates that a search engine is being used. In a second substep 214, the submethod 210 analyzes the query structure and extracts the characters which occur after this word/expression and stores the same in the TBM listing (col. 3 of Table 3, above). Alternatively, the entire code from the location field 176 corresponding to the search engine search is stored in its URL form in order to permit easy re-execution of the search upon clicking on the URL. In substep 216, optionally, the submethod 210 checks the query against a table of forbidden keywords. In substep 220*a*, if the words are forbidden, then the user authorization table is checked to see if the search is nonetheless authorized (i.e., an indicator such as<<no forbidden keywords>>is not found in the authorization table). In substep 220*b*, if the user or project does restrict access, then the submethod 210 denies access and displays a warning window informing the user that access is denied.

In substep 220*c*, if the user and project have no restrictions, then the request is processed. In substep 222, if the words are not forbidden, then the request is processed. In step 224, the research is continued.

In an alternate embodiment of the submethod 210, the first substep recognizes, in the following manner, when a search engine search term is entered. After the method 60 receives a character on a character based input device such as the keyboard 26, the method analyses the character and determines if the character received was an "enter" key. In general, the "enter" key represents any input signal which indicates that the user desires to transmit information to the server. If the submethod 210 receives the "enter" key, the characters immediately before the enter key that were entered by the input device such as the keyboard 26 are identified to determine whether they represent a manually input URL or a search keyword or phrase. If it is determined that a search was initiated, then the keyword or phrase typed by the input device just before the "enter" key was pressed, together with any Boolean operators and the URL, are extracted and the keyboard-entered words or phase and URL are stored in the appropriate column of tables 2 and 3 (alternatively, as mentioned above, the URL in the location field may be stored in order to permit re-execution of the search during a later research session). If it is determined that another URL address has been manually entered (by, for example, analyzing the text immediately before the entry of the return key and/or detecting a download command, prior to the download being initiated), then an input window 160 is presented as described above with respect to the submethod 190, for example, in order to provide the opportunity to query the user as to whether the new site to be visited should be associated with the same project name 100.

In another feature of the method 60, new browsing windows may be opened. When a new browsing window is opened, the user inputs a new project name 100'. Upon the initiation of a new project name 100' in a new window, the termination time is stored for calculation of the actual time on the prior project when the research session associated with that project name 100 is terminated. The noted time also marks the start time for the research associated with the new project name 100'. When the user wishes to terminate the overall browsing session, he must exit out of all open browsing windows, where he is asked whether he wishes to store the TBM listing generated during the session (which will be presented to the user upon his next login under his user name 90), begin a new session associated with a new project name 100' or terminate.

Figure 16:
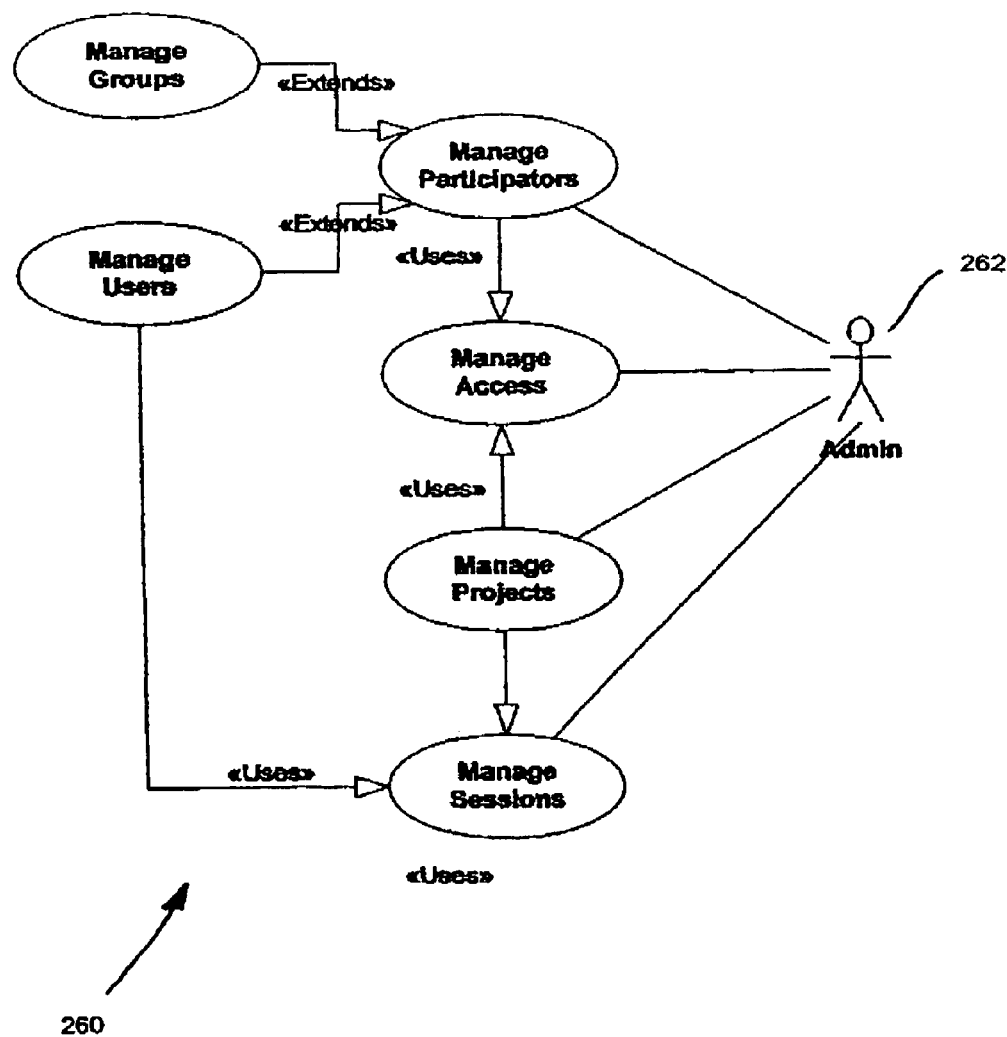
FIG. 16 is a UML class diagram of a system administration module of the invention

Referring now to FIG. 16, presented in UML diagram form, in another feature, the method 60 provides a system administrator module 260 which permits the system administrator 262 to manage participants (such as groups/categories and users), access, projects and sessions. The project names 100 which a user may research and the users who may have access to certain project names are managed via an access management window. The system administrator module 260 facilitates the management of access, URL management (including deleting "marked for deletion" URLs), user performance evaluation, use of a focus quotient Q, setting access limitations, time limits, project name access restrictions, and issuing and changing passwords and user names. The module 260 allows the system administrator 262 to compare the relative performance of each user using the focus quotient Q, a performance measure, by displaying a bar chart (now shown) showing the relative score calculated for each user over a specified period of time.

Where a Microsoft "ACCESS" relational database is used, "forms" and "reports" such as these are easily created and presented. A form shows one record in a specified format and allows the system administrator 262 to step through records one at a time. A report shows selected records in a specified format, grouped into sections with different kinds of totals (including sum, minimum, maximum, average).

Figure 18:
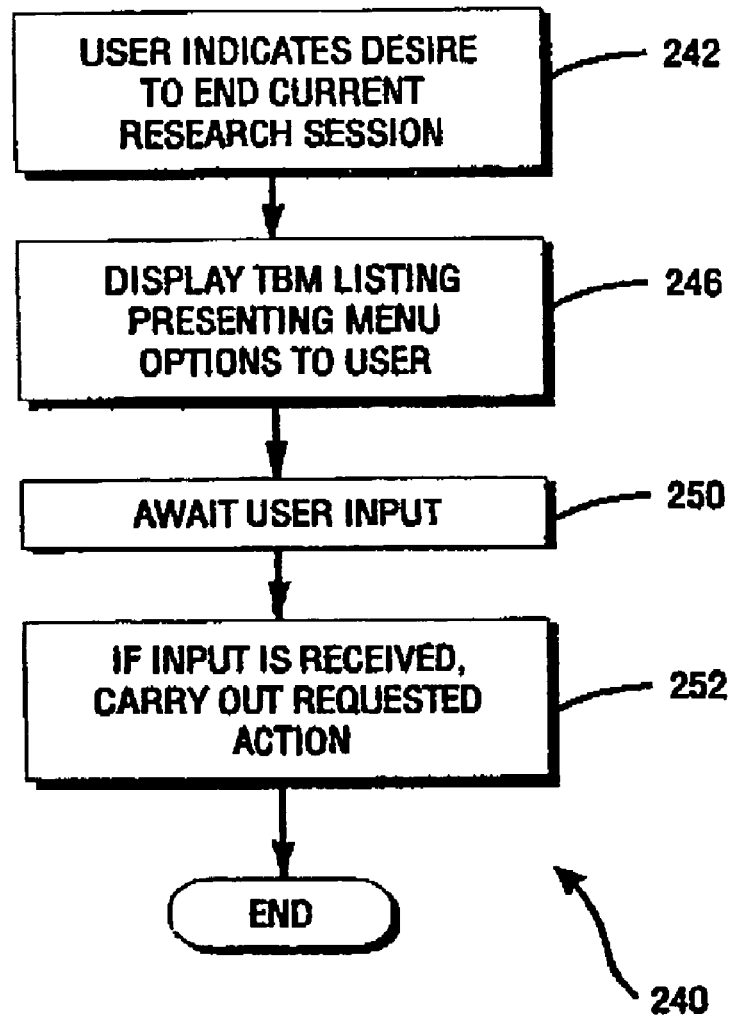
FIG. 18 is a flow diagram of a logout submethod of the invention.

Referring now to FIG. 18, a flow diagram of the logout submethod 240 of the present method 60 is shown. In a first substep 242, the user indicates, via a pull down menu or by clicking on a menu item presented when selecting a hypertext link or anchor tag, that he would like to end the current research session. In a second substep 246, the submethod 240 presents the user with the listing of URLs created by the TBM feature of the invention, permitting the user to launch another research session associated with another project name 100', using one of the hypertext TBMs on the list. In a third substep 250, the submethod 240 awaits user input. The TBM listing includes menu options such as "logoff without saving TBM", "save TBM and logoff", "begin new research session".

In a fourth substep 252, once the user input is received, the submethod 240 carries out the task associated with the input received. For example, if the user clicks on a TBM in the TBM listing, then the submethod 240 returns to step 86 above and presents the user with input window 101. If "begin new research session" in input window 101 is selected, then the user is presented with the URL listing shown in Table 2 and/or a TBM listing associated with the input project name 100'. If the user selects "log off without saving TBM", then the connection closes and the user logs off without saving the TBMs. If the user selects "Save TBM and logoff", then the submethod 240 prompts the user for a file name and confirmation that the current TBM listing is to be saved in association with the current project name 100 or another project name. The TBM is saved, the connection closes and the user logs off. In this manner, the TBM information stored in the URL listing and presented later allows the user to consolidate his research by providing a means for him to time-shift possibly irrelevant research, without having to permanently save the URLs in a traditional "favorites" list or "bookmark" list and to associate TBM listings with specific project names 100. Further, the user may place potentially irrelevant sites on the TBM listing without going to these sites (thus, they do not show up on the navigation history and are therefore not permanently saved). The user may later edit this TBM listing or initiate personal research in association with it.

In still another embodiment of method and system of the invention, secure access (to varying degrees) is provided to HTML documents posted on publicly accessible servers across the Internet or on an intranet. In a first level of security, the confidentiality of the URL address themselves ensures that only those who have the URL address will have access to the page. For example, a URL may be the following: http://uspatentinfo.com/conf-docs/4024-116-00181.html, which may be e-mailed, preferably in a secure manner, to other persons who are to have access to the document so posted. Unless a user knows the directory and file name extension to the address of the home page, he will not be able to find the document.

The method of posting these documents involves the following representative steps. In a first step, the user selects an option for the pull-down menu of his word-processing program which states "publish to intranet or Internet". In a second step (activated by the first step), the method converts the documents into HTML. In a third step, the method calls a web page publishing subroutine (such as that embedded in "FRONT PAGE EXPLORER"), opens the page and displays the document in HTML, for possible editing. In a fourth step, after the user selects "publish" from a drop-down menu, the method opens an Internet connection, queries the user for the name and address of the site to which the document is to be published (the user name and password optionally being automatically provided). In a fifth step, when these inputs are correctly provided, the method publishes the document. The posting of documents at obscure URLs highlights the usefulness of having URL listings of Table 2, FIG. 10, URLs stored in retrievable form through the input of a password 92, user name 90 and a project name 100 which point directly to these confidential documents. Further, this highlights the importance of the invention for preventing access to URL listings and navigational histories (such as those of FIG. 10) in association with project names 100, where the user seeking access is not authorized according to an authorization table such as that of FIG. 8.

In another, more secure level of security, between the third and fourth step above, the user selects "encrypt" from a drop-down menu, after which the user may be prompted for the project name 100 to be associated with the document. Optionally, where the user is using the method 60 of the invention, the project name 100 is supplied without querying the user (because it has been stored after the user's input at the beginning of the research session) and the document is automatically encrypted such that the decryption key is the project name 100 (or some hashing thereof). Thus, when the method 60 and system 20 of the invention downloads these documents, the project name 100 already input during step 134 or step 86 above (such as a client matter number or project code name) is automatically used to decrypt the encrypted page such that the project name is the decryption key. This is accomplished by adding an identifier at the head of the encryption page, which identifies the page as encrypted once the download is initiated, thus executing a decryption program embedded in the method 60 into which the project name 100, stored in association with the research session, is input, for decryption during loading of the page.

Having the decryption program resident on the client is advantageous as this allows the information downloaded across the public Internet or intranet to remain encrypted. However, through a standardized protocol, the page to be downloaded can include the decryption program which extracts the project name 100 and, optionally, for further security, the IP address of the requestor (for checking against permissible IP addresses) upon initiation of the download and then transmits a decrypted page across the Internet.

It should be noted that, optionally, a company using the method 60 of the invention across its various business units may encrypt all its documents (both on the intranet or published on the Internet) such that the decryption key is the project name 100, without the inconvenience of having to input a unique decryption key whenever such an encrypted document is downloaded to a client computer 22. In this way, access to project documents is conveniently and seamlessly provided exclusively to those who know the client matter number/project name. This ensures (together with the matching table mentioned above) that the navigation history generated during a research or work session is associated with the correct project name 100.

Note that by storing the documents in encrypted form, there will be no keywords with which a spider of an ordinary search engine will be able to identify or classify the page. Therefore, the URL location of the encrypted site will be unknown to such search engines, and thus, such site locations will remain unknown to all who attempt to locate the site by keywords.

Thus, it can be clearly seen that the invention significantly enhances the ability of companies having offices at different geographical locations (or dealing with offices of other companies) to be able to access confidential information posted at various servers (of, for example, several companies, consultants or specialists working together on a common project) on the Internet in a secure manner yet in a manner which avoids having to remember separate access codes and passwords for getting beyond a firewall, for example. Further, the invention significantly enhances a user's ability to securely post information on publicly accessible servers, thus making such information available to team members located as several locations across the Internet. Such a feature is particularly useful for consultants who must work with confidential documents of a company or client, but which do not have the established trust relationship with the company, at least not at a level which would warrant their being able to access the company intranet.

In another embodiment, the method 60 is implemented on a server hosting a page with content specific to a particular profession or industry, and anyone using a prior art browser may then access this web site on the server, which will provide the graphics such as input windows 200 and 200', and bookmarks available for all to use. The bookmarks resident on the server are pre-selected to aid in researching the Internet for foreseen purposes specific to the particular profession. In this alternate embodiment, it is preferred that the browsers be configured to load this page as their opening page to the Internet.

Figure 19:
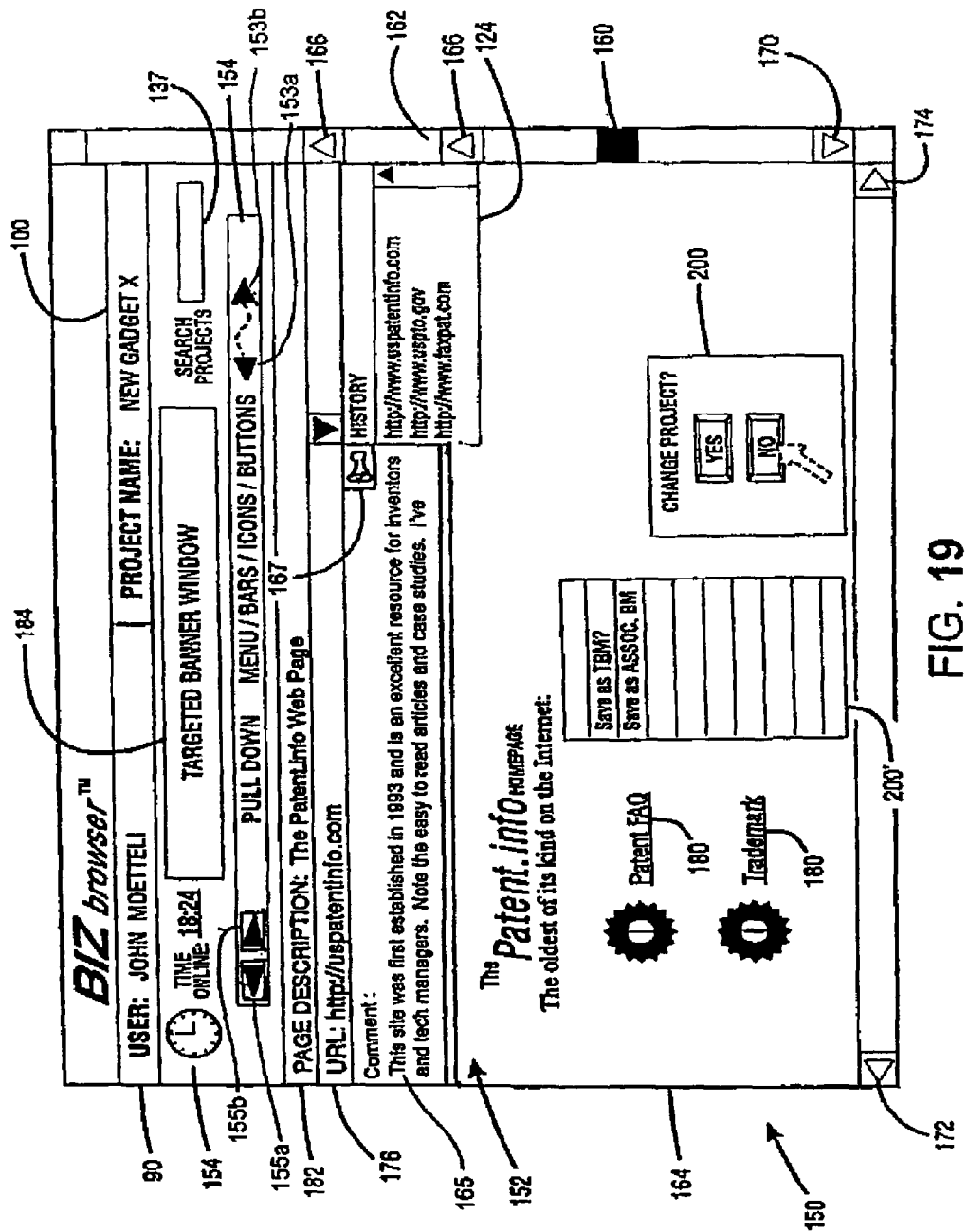
FIG. 19 is a diagram of the layout of a GUI of the invention which enables a user to sequentially follow a navigation history created by another.

Referring now to FIG. 19, in still another embodiment, the method 60 includes a GUI 164' for presenting content (i.e., a downloaded HTML page, a document such as an e-mail, a Word document, a spreadsheet or a graphic) which includes a comment window 165 having a text field and controls opened by an icon 167 which controls the playback and recording of sound files, for users' comments on these contents. This is accomplished via a right click mouse menu option which, if selected, opens an input window 199 (in FIG. 13) that allows comment, either as text or a sound file, after the user has had a chance to review the content. When the user inputs his comments, the user may save the comment in association with the web page for presentation to others who follow after the commenting user. The user may comment on several web pages consistent with a chosen project name theme. To aid others in following this project name theme from one web site to another, signpost-like back and forward icons 153a and 153b on the upper menu bar provide a convenient means for those who follow this "project trail". The traditional back and forward icons 155a and 155b continue to move the between websites that he has actually visited. Only when the user visits sites under the project name 100 in the project folder and does not deviate from the order of project sites under the project name 100 will the signpost-like icons and the standard icons appear to produce the same result if selected.

Figure 20:
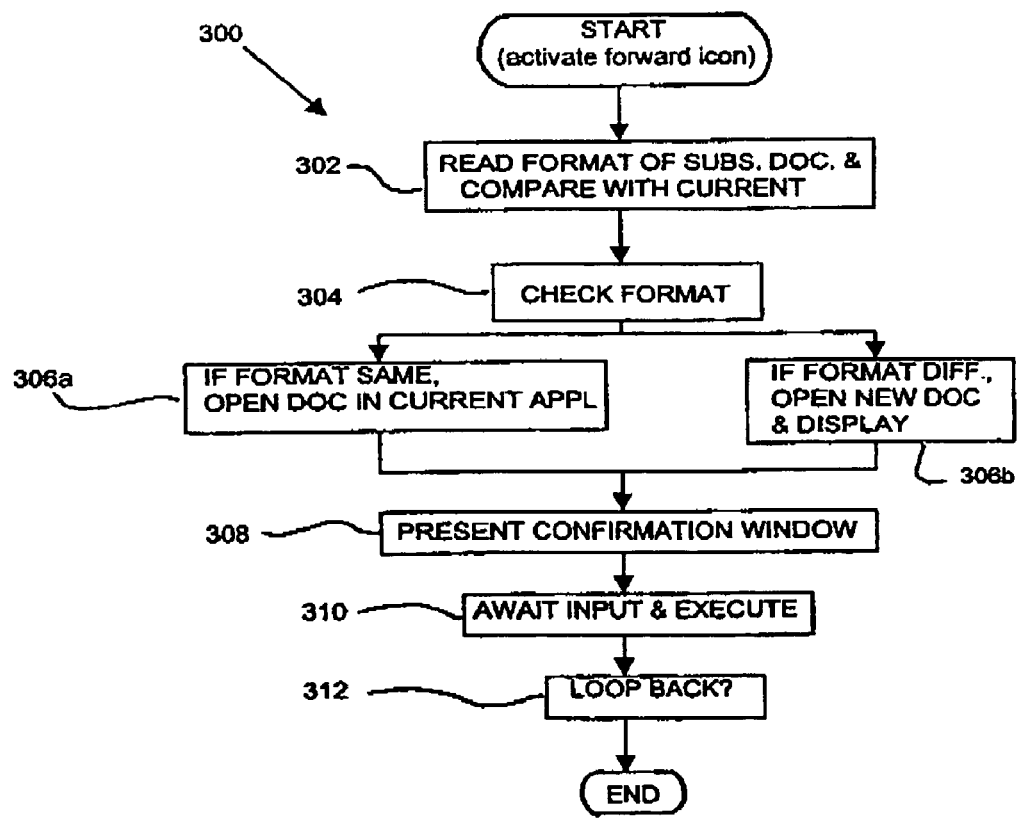
FIG. 20 is a flowchart of a submethod of the invention for activating forward and back icons which navigate sequentially between content saved under a project name.

Referring now to FIG. 20, when the forward signpost icon 153b is activated, a submethod 300 executes the following steps. In a first step 302, the submethod 300 reads the format of the next or subsequent document in the project folder and compares this format with that currently open, including whether the comment is in the form of text or a sound file. In a second step 304, the submethod 300 checks the format of subsequent document. In a third step 306a, if the formats are the same, the submethod 300 opens the document/sound file into the corresponding application. In a fourth step 308, the submethod 300 then presents the user with a confirmation window (not shown), querying the user as to whether he would like the previous document to be closed, or minimized. In a fifth step 310, the submethod 300 awaits user input and when received, executes the action requested. In an alternate third step 306a, if the formats of the documents are different, the submethod 300 opens the application associated with the selected document, and displays the subsequent document. In a sixth step 312, the user may re-initiate the submethod 300 by clicking on the forward icon 153b. When the back signpost icon 153a is activated, essentially the same submethod 300 is executed, except that the submethod moves to the document which is listed prior to the current document in the project folder.

This embodiment advantageously creates a signposted trail through the Internet that others can follow. Thus, a teacher/guide can create a trail, including comments on each site, to enable students to follow the trail, read the comments and the site's contents and learn in a directed manner. Thus, it is envisioned that this feature alone will become widespread as a tool to navigate the Internet using an experienced guide (i.e., the "scout" of the original trail). When this embodiment is combined with the integration of documents of other formats (described in more detail below), a powerful learning tool is created.

Those skilled in the art will appreciate that the hardware depicted in FIGS. 1 and 2 may vary for specific applications. For example, other peripheral devices such as optical disk media, audio adapters, or chip-programming devices, such as PAL or EPROM programming devices well-known in the art of computer hardware, and the like may be utilized in addition to or in place of hardware already depicted.

For example, a computer program product (i.e., a control program) can reside in computer storage (e.g., 30 or 32). However, it is important that while the present invention has been, and will continue to be, described in a context of a fully functional computer system, those skilled in the art will appreciate that the method 60 of the present invention is capable of being distributed as a computer program encoded on a floppy disk, CD ROM, or other form of recordable media or via any type of signal bearing media or electronic transmission mechanism, such as a modem or a fiber optic connection to the Internet.

The functionality of the present invention is integrated into an HTML-compliant browser, such as "NETSCAPE NAVIGATOR X", "MOSAIC", "MSN", or "INTERNET EXPLORER X". It should be understood, however, that the browser method 60 of the invention need not be inseparably integrated.

Optionally, a separate program interfacing with the open structure of "NETSCAPE" or a plug-in, embodying the steps of the method 60 of the invention, may augment the functionality of an existing browser. Note that XML may substitute for HTML in the context of this disclosure. Further, the method 60 of the invention, integrated with a GUI comparable to that shown in FIG. 13, may call a third party external browser. For instance, "MAC OS X" may be used in a manner known in the art to communicate with an external browser in a manner that permits it to appear as part of the browser method 60, although it is not.

As used herein, the "information object" or "information" output to the viewer during the link process should be broadly construed to cover calls to any and all forms of messages, notices, text, graphics, sound, video, tables, diagrams, Applets, and other content, and combinations of any of the above. Thus as an example, in lieu of the option window 200 or 200', an audio query concerning the use of TBM or associated bookmarks, demanding an audio response, may be used.

While the preferred embodiment has been described in the context of an Internet browser, the techniques of the invention apply (as shown in FIGS. 3 and 4) whether or not the user accesses the World Wide Web via a direct Internet connection (using an Internet access provider 29) or indirectly through some on-line service provider 28 such as "COMPUSERVE", "PRODIGY", "AMERICA ONLINE", etc.

Therefore, the computer "network"25 in which the invention is implemented should be broadly construed to include any server-client model from which a client can link to a "remote" document, even if the document is on the same machine or on an intranet.

Figure 21:
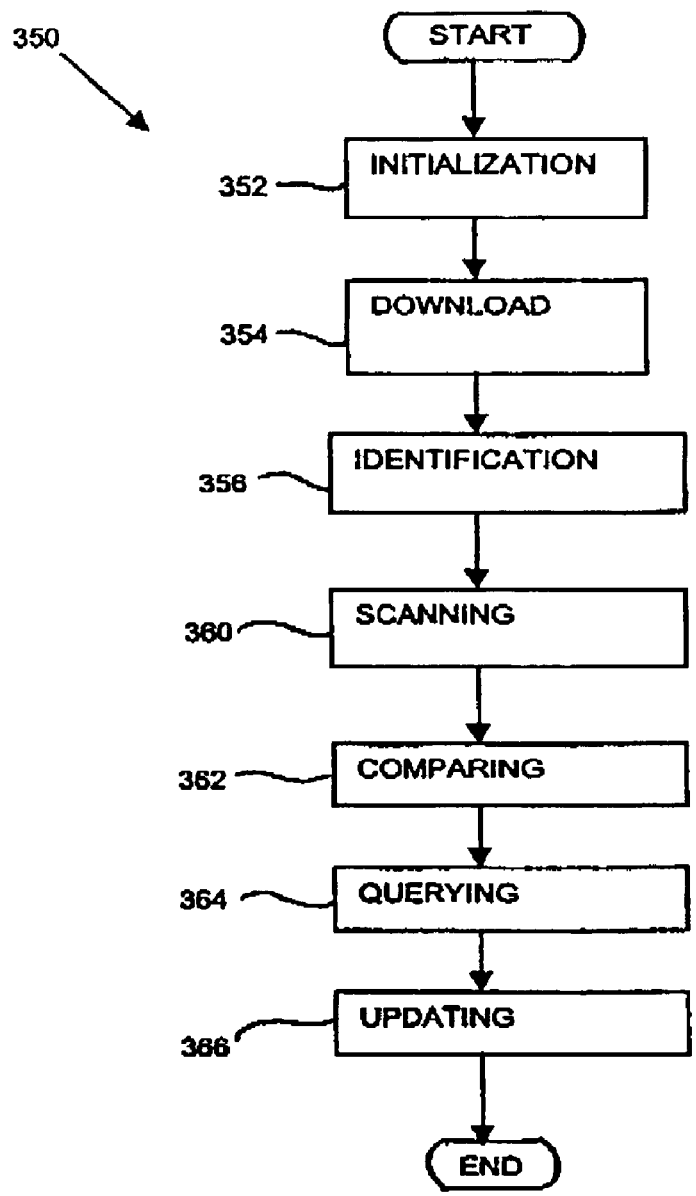
FIG. 21 is a flowchart of a submethod of the invention operating on a server that scans and updates the bookmarks and other content on a browser when the server is accessed.

Referring now to FIG. 21, in another embodiment, the method 60 cooperates with a corresponding software resident on a server 54 such that the server-resident software scans and updates the bookmarks and other content on the browser when the server is accessed by a compatible browser.

This may be accomplished in the following submethod 350. In an initialization step 352 on the client side, the browser is either pre-set to point to a download page on which is resident associated updating software or the URL of this server 54 is input into the URL field 176 of the browser. In a download step 354, the download of the page is ordered on the client-side, through the user's pressing the "go" button or hitting "return". In an identification step 356, the ordered URL or IP address (if performed on the client-side) or the incoming browser identifier (if performed on the server-side) is checked against a list of IP addresses or compatible browser identifiers, as the case may be, associated with downloadable updates for bookmarks. In a scanning step 360, if a matching IP address or browser identifier is found, then after the download of the page, the submethod 350 initiates a scanning of the browser to read an identification tag associated with the version of the bookmarks on the browser. In a comparison step 362, the submethod 350 compares the identification tag associated with the version of the bookmarks and other content on the browser with the latest version available on the server 54. In a querying step 364, if a version of bookmarks and other content is available on the server 54 that is more up-to-date than that on the browser, the user is queried as to whether or not he would like to have his pre-loaded bookmarks and related content updated. In an updating step 366, if the user responds in the affirmative, a download of the upgrade is initiated during which all URLs that have broken links are marked for deletion, new URLs and associated descriptions are added to the bookmarks and other content on the browser, and descriptions and keywords of existing bookmarks and other conent are updated, where appropriate.

In another embodiment, the method 60 of the invention may be used in a server-based computing architecture that allows the method to run on a remote server 54 operated by a system administrator. This is commonly known as running the application as an ASP (application service provider). The model of the project-based, group browser functioning as an ASP is particularly timely, as the market place for ASPs is growing very quickly. It also provides scope for other client/server configurations as the general client market moves increasingly towards support of thin client devices such as Palms, Pocket PC's, WAP or HML enabled phones and other digital portable devices. These devices run on remote, server-based applications, pulling the application processing back to the server from the PC or laptop, in order to avoid the computing power and memory requirements that are built in to most PCs, while minimizing the amount of dedicated bandwidth required (for further info, see www.allaboutasp.org and www.esoft-global.com). The system administrator provides the required software, hardware and updates; an Internet connection to the user's PC or other digital device; management of access rights for group members; and management of the intellectual property rights associated with the content that is generated.

In a first advantage, this embodiment allows users to avoid the up-front and continuing costs and technology complexities that might be associated with a client-side application, with the sacrifice of some flexibility because the user may have limited memory, and graphics display and keyboard resources in current thin client device technology.

Focusing on the server-side architecture, the method can be more generic by removing the pre-packaged, client-side database of profession-centric, pre-indexed links and comments while taking full advantage of the basic features of the method 60 including bookmarking, tracking navigational history, and creating research summaries by project name, and pooling of project research data for multi-user access, etc. This embodiment is more generic in that any group, including persons who do not share the same local network (i.e., Intranet) can share the project-oriented features of the method 60. These groups might include friends, research teams in different universities, artists, private and public sector groups, church groups, etc. As in the above embodiment, the server-based computing architecture is used, thus further allowing the user to avoid the costs that might be associated with a client-side application and concentrate on their own research or other creative pursuits. In short, this service builds on and facilitates a feature of the Internet that has already garnered attention, the building of online communities which to a certain extent Internet portals currently try to achieve, and a server-based computing architecture.

The above server-based embodiments are significant because with the advent of the Internet and other communications systems, persons around the globe are collaborating in ways that few would have imagined just a decade ago. The new mentality for these types of associations among friends or professionals already exists. Internet chat groups provide a ready example of this type of phenomenon.

However, the availability of technical mechanisms for participating in joint, multifunctional associations and communications remains limited. The project-based, group browser provides a new and unique tool that will give these groups the power to take these cooperative initiatives to the next level.

By way of a working example, suppose a group of artists, each with his or her own studio and located in a different part of the world, would wish to collaborate on ideas, techniques, new forms of expression, information, etc. In fact, during the height of impressionist period, many painters who later became world famous did just that, moving to be in close proximity (environs of Paris, France) in order to achieve this peer review and stimulation. Today, artists would not expect to travel to, or live in, a single location (although a number of modern art artists are attracted to the New York area.). Project-based, group browser enables a new dimension for these artists. Rather than exchanging emails (enclosing URLs), or setting up their own web pages with links to other sites, these users can create a joint project, a portal and web site using the project-based, group browser. The project-based, group browser is a technical mechanism that would allow users to share and discuss all forms of creative content as it is developed, while restricting access to this content to the group and enabling the technical documenting creation copyrights to be associated with any content generated. These users have a communal mechanism for culling the results of research on the Net, all in one web-based interface.

In a modification of this embodiment, the method 60 includes project management features which allows different format documents such as word, HTML, XML, and EXCEL, or graphics files to be stored together in association with a common project name 100, such as mentioned above in association with the project management module. Using this functionality, users can add URLs to web pages, cache web pages of interest, define links, and save documents, all within the project-based, group browsing application. By utilizing remote procedure call (RPC), ActiveX and COM (Common Object Model) technology in conjunction with popular office applications software installed on client PCs and devices, the server imports, stores, arbitrates access and re-transmits documents and application data files (spreadsheets, CAD drawings etc) to clients for local editing and resubmission to the server. Further, through the integration of chat facilities and optional text to speech (TTS) software users can conduct real-time group chat.

Thus, the project-based, group browser provides, via an Internet connection (or alternatively via a simple TCP/IP network connection without the need for other web server software), a generic web interface, with functionalities already described in association with the project-based browsing method, enabling web surfing, providing web tracking history, bookmarking, establishing links, the creation of an HTML page or set of HTML pages, the posting of documents, pictures, database files and other media, as well as other features-all of which can be shared by the group. Thus, any group participant can enhance the value of the collaboration by adding his or her own contributions (bookmarks, links, search results, new content, etc). The group founder tailors the initial interface to indicate the name of the group, any relevant information, or group procedures or rules. Group members submit requests or suggestions to the group founder. These suggestions include attachments of documents of interest and research summaries on topics of interest, together with the researcher/group member's comments on each site in the ring.

After review of the suggestion, the group member can add the suggestion to the project tree structure at the appropriate point, such as under the member name or under a project folder that has to do with the particular topic. The group founder creates a subdomain HTML page under the domain of the purveyor of the system. Similar to the Netscape Communicator or Internet Explorer, a participant can set his or her computer default home-page to this subdomain, the newly initiated project-based, group browser interface for the group.

Further, the project-based, group browser is a secure application. For simple projects—such as friends wishing to share their interests, favorite web sites, family news, creating a wedding registry, etc.—a name and password would be sufficient to gain access to the full features of the project-based, group browser. The name and password combination is the most prevalent access system on the Net today, used even by financial services such as E*Trade. If a higher level of security is required, digital signatures can be required of and issued to group participants. This would be an optional feature, like many others, that any group could itself choose to implement (either at the outset or as the project-based, group project evolves).

All data developed through the use of the project-based, group browser, including bookmarks, web pages, associated documents and files, would remain on the servers of the purveyor of the system.

As with the E*Trade application, in which an individual account holder's data resides with E*Trade (unless downloaded for tax purposes, for example), all information that is generated through use of the project-based, group browser is accessed and processed remotely. The purveyor of the system provides the technical infrastructure and services, including servers, dBs, firewall, hosting and web site services, etc.

In a refinement of this embodiment, a rights management module is provided so that users can define and regulate several key aspects, such as: (i) who authorizes adding or removing group members; (ii) who can add or delete information and data, including bookmarks, web pages, documents, content, etc.; (iii) who is able to download any information to their local machine, and when can this occur (e.g., during the project-based, group browsing project, or only at the end); (iv) who is able to terminate a project-based, group browsing project; and (v) who has rights to any information and data that is generated during the project-based, group browsing project.

This control is provided through an access control matrix having tailored permission sets for each user or user types. Preferably, the permission sets are determined by the group founder, meaning that a user with special privileges is able to define and determine the rights management structure for a project-based, group browsing project, using a flexible array or options that would be provided through the browser software.

In an optimum configuration, the method 60 runs on servers 54 and systems provided by the purveyor of the system and managed by a system administrator. The system administrator automatically upgrades the software for use by current project-based, group browser groups, so that the most up-to-date platform is always supplied. As technology advances (e.g., broadband connectivity), new features (video, audio, conferencing, etc.) would be available from the purveyor. In this manner, none of the hardware or software that enables the project-based, group browser to run need be located at the client level. Thus, individuals, such as the individual artists mentioned above, need not concern themselves with technological complexities, capital expenditures and associated start-up issues. Not only is the group better able to afford to use a highly evolved application, but they are free to devote themselves to the non-technology work and ideas in which they are interested.

Where there is ample computing power to run a client-side project-based browser of the preferred embodiment, additional advantages are gained in that the server-based embodiment is completely compatible with the client-side embodiment. The project folders and research summaries created by the client-side application can be imported, synchronized and merged with the server-side application. In this manner, even when the server-side application is temporarily unavailable, inaccessible for some reason, or where the user has not subscribed to the server-side application, the user can continue to surf the Internet adding URL and commenting on their content.

In a payment feature, the project-based, group browser operates as a subscription service, in which use of the browser is rented for a certain period, subject to renewal. Rental fees are based on the number of participants in a browser group, with the ability to add or remove members (e.g., payment of a monthly rental fee). If a group member wishes to leave the browser group, they will simply cancel prior to the end of the subscription period. Alternatively, a one-time start-up fee may be charged. The method 60 encompasses, for a fee, other ASP applications that are automatically launched upon clicking on an icon of the particular element stored under the project name 100 of the group browsing method.

Several options would exist (based on the rights management, above) as to the content that is generated upon completion of a project-based group browsing project. Examples of such options are to: (i) delete all material resulting from the project-based, group browser group; (ii) maintain an archive of the material, for a fee; (iii) provide the content in a form which is directly usable by a project-based browser, thus permitting continued use and enhancement of the group browsing project content on the client-side, possible where the client is running project-based browsing software; (iv) allow, for a fee, a complete download of the content from the project-based, group browsing project to those members of the group with the right to do so; or make the content available in CD-ROM (or other digital carrier) format, for a fee.

As described above, the method may be integrated to include management of e-mails, documents, and general files associated with a common project name 100. This, combined with the GUI 164' shown in FIG. 19 which includes a comment window 165, will enable navigation of the net, annotated with documents of other formats, to enhance the use of the net for instructional purposes.

Further, the method, upon access to a web page, permanently associates a URL associated with the web page with the user on a global navigation history associated with the project name accessible by other users. If the user merely activates the URL of the web page, the user may store the URL in a private, user-editable presentation for later access, thus providing the user with a means of editably bookmarking interesting URLs while promoting focused research on the initial project, until the user has logged out of the project name. Still further, the method permits the storing for later access, and the printing of navigation history and research summary in association with a project name and user name. The resulting efficient acquisition of information is applicable industrially in every domain of technology.

The figures illustrate one method for practicing the present invention. The flow diagrams described herein broadly illustrate the logical flow of steps to perform one embodiment of the present invention. Accordingly, numerous steps may be added to, or taken away from the flow diagrams, irrespective of any occasional use of the term "optionally", without departing from the scope of the invention. Furthermore, the order of execution of the steps in the flow diagrams may be changed without departing from the scope of the invention. Additional considerations in implementing the method described by the flow diagrams may also dictate changes in the selection and order of the steps.

Figure 22:
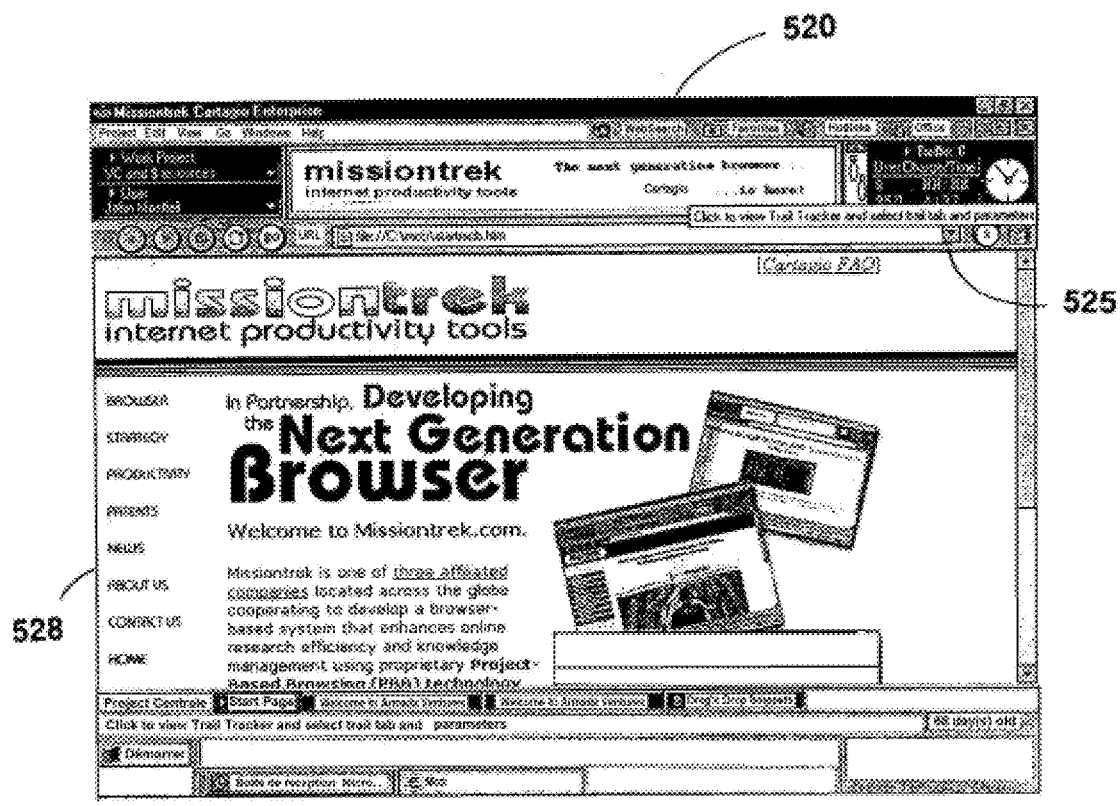
FIG. 22 is a screen print of a Graphical User Interface ("GUI") on which the invention acts.

A browsing method is provided which enables a user to follow a listing of links 514 in a data register, from one link to another, and to reorganize based on preferences, such as by user defined relevancy or by date of creation, according to International application WO0101275, the content of which is incorporated herein by reference hereto. Referring to FIG. 22 which is a screen print of the Graphical User Interface (GUI) 520 having interface frame 525 and a display window 528 with which the method 510 and the system 200 (shown in FIG. 21) of the invention operates. The method 510 is encoded on a computer readable and executable medium on a computer, such as a PC, a diskette, a server on the Internet, or the Internet itself. The method 510 is implemented in software that instructs a microprocessor to manage system components, inputs and outputs in a manner that controls a GUI.

Figure 23A:
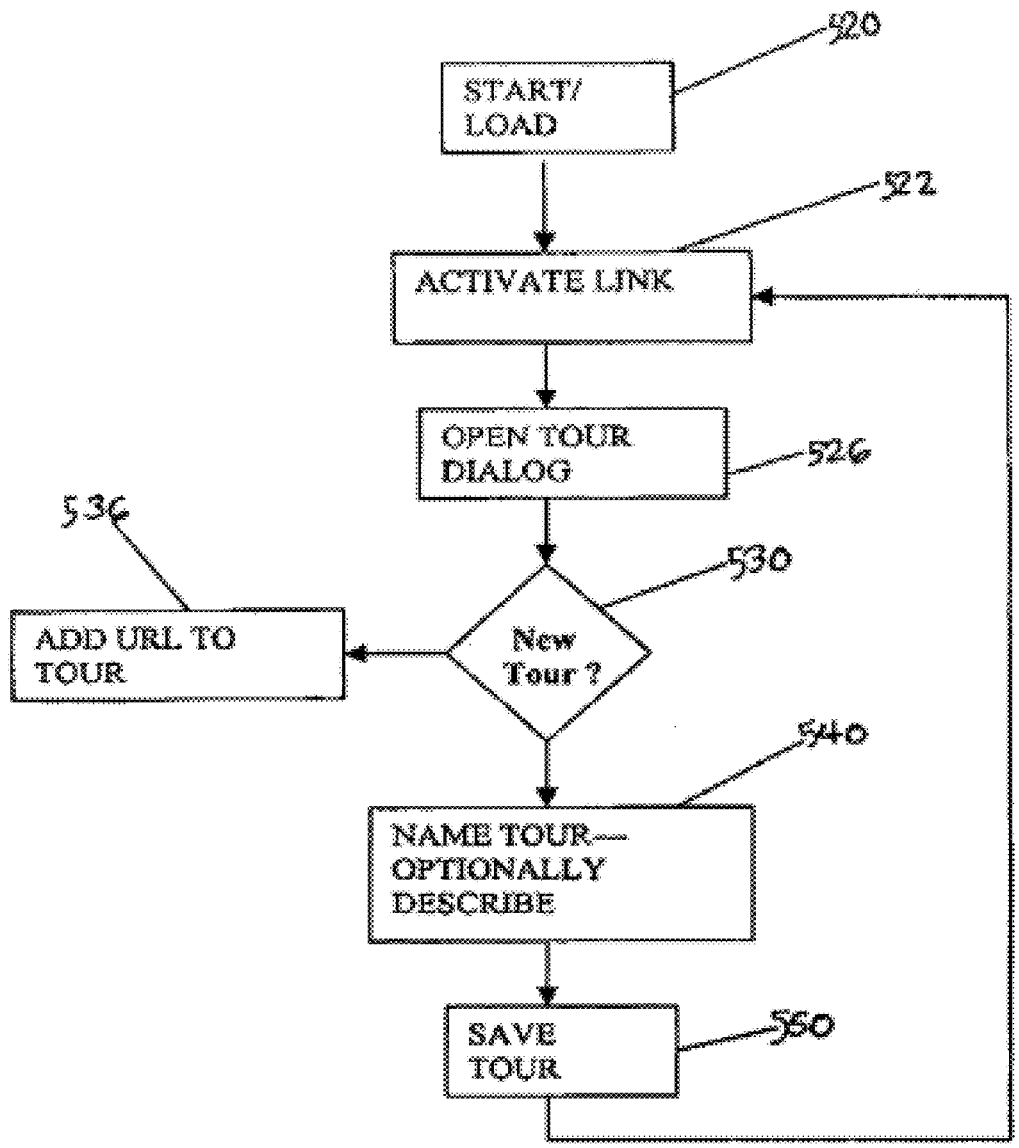
FIG. 23a is a logic flow diagram of the tour creation submethod of the invention.

The method 510 and system 200 enables the creation of a summarizing tour 512 of URL links 14 associated with a project or theme 16. Referring now to FIG. 23*a*, the method 510 includes the following steps. In a first step 520, by clicking on an icon (not shown) for example on the user's desktop, the method 510, operating on the system Z of the invention, is loaded into the working directory of the computer. In a second step 522, a link 524 (shown in FIG. 26) is activated.

Figure 27:
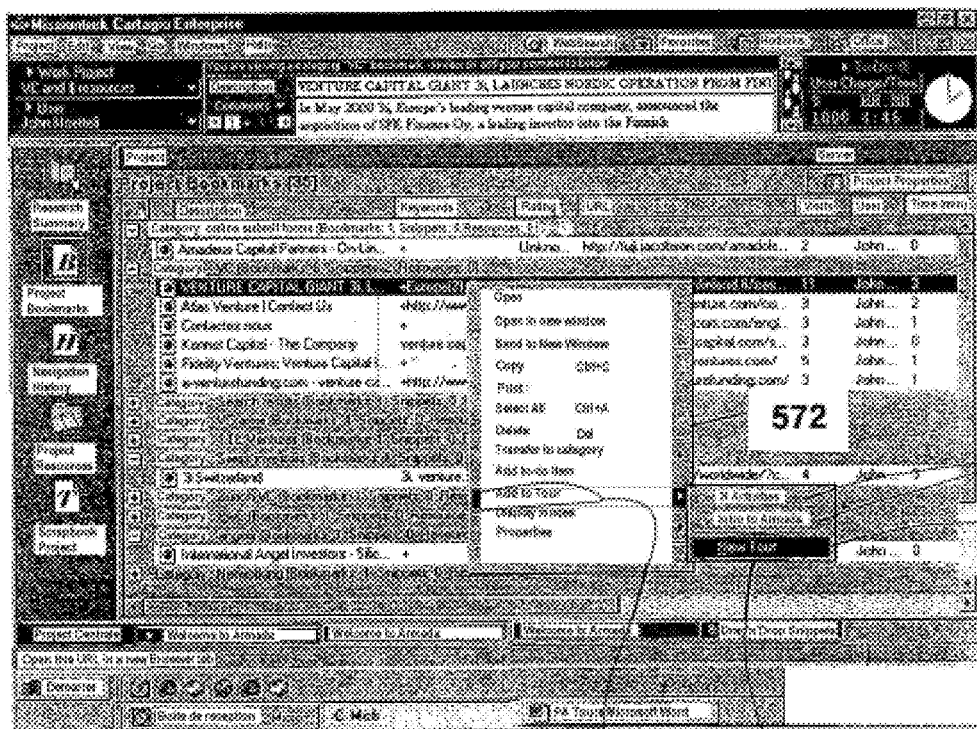

Referring now to FIG. 27, in a third step 526, when initiated, a tour creation dialog 534 opens. In a fourth step 530, the user is presented with a menu 532 that enables him to identify an existing tour or create a new tour 534. In a fifth step 536, if the user identifies an existing tour, the URL so selected is added into this existing tour using tour link editing (TLE) submethod. In a sixth step 540, if the user chooses to create a new tour, an input window 542 is presented to the user in which he can input the name of the tour which he would like to create and, optionally, a description, in corresponding input fields 544 and 546. In a seventh step 550, the user clicks "OK" 552 and the new tour is created having a single link. The method 510 then returns to a state in which it can activate step 522, at the initiation of the user.

Figure 23B:
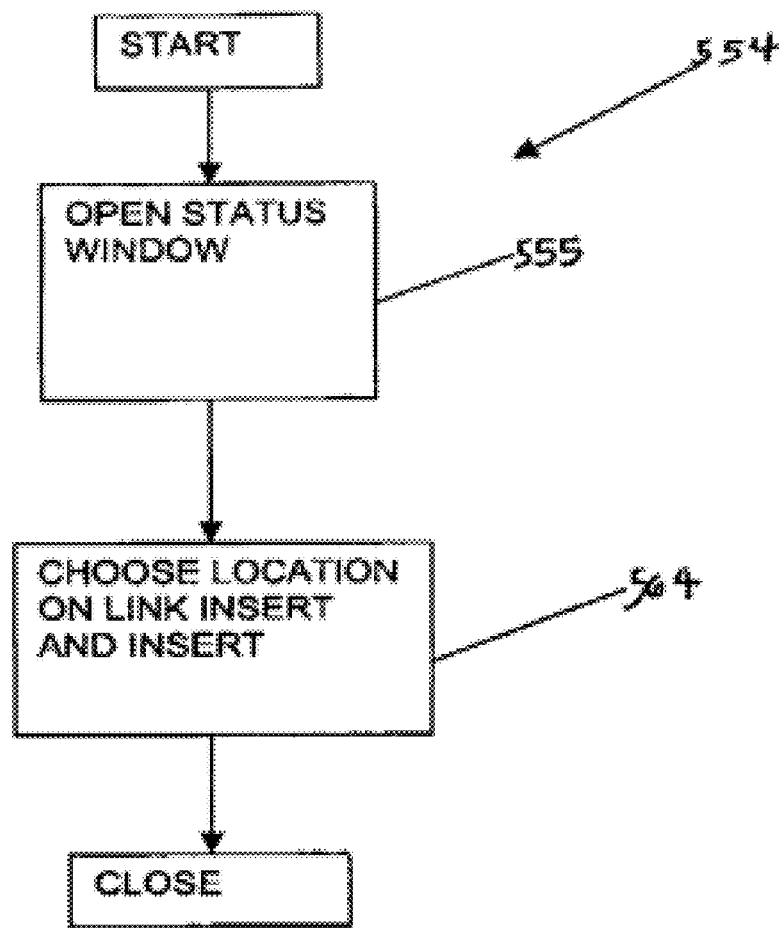
FIG. 23b is a logic flow diagram of a tour editing submethod of the invention.
Figure 31:
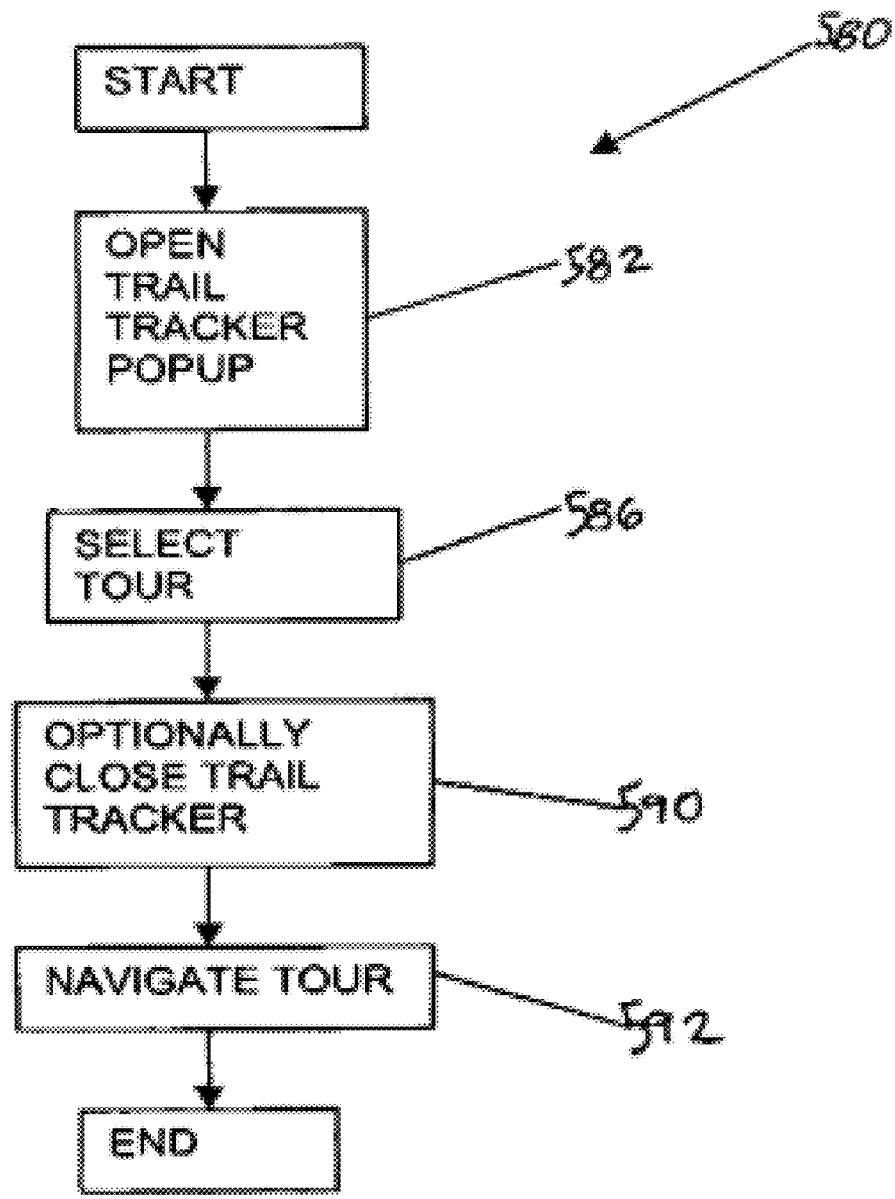

Referring now to FIG. 23*b*, the tour link editing submethod 554 includes two basic steps. In a first step 555, the submethod 554 presents the user with a tour status window 556 (shown in FIG. 10) that displays all the existing links 560 in the tour and facilitates the editing of these links through the execution of several steps. Referring to FIG. 31, a vertical insert bar 562, having insert icons 564 between lines in which the existing links are displayed, if any. In a second step 564, the user chooses the location of link input by clicking on any of these insert icons 564 and the to-be-added link is automatically inserted between the corresponding adjacent links.

Figure 24:
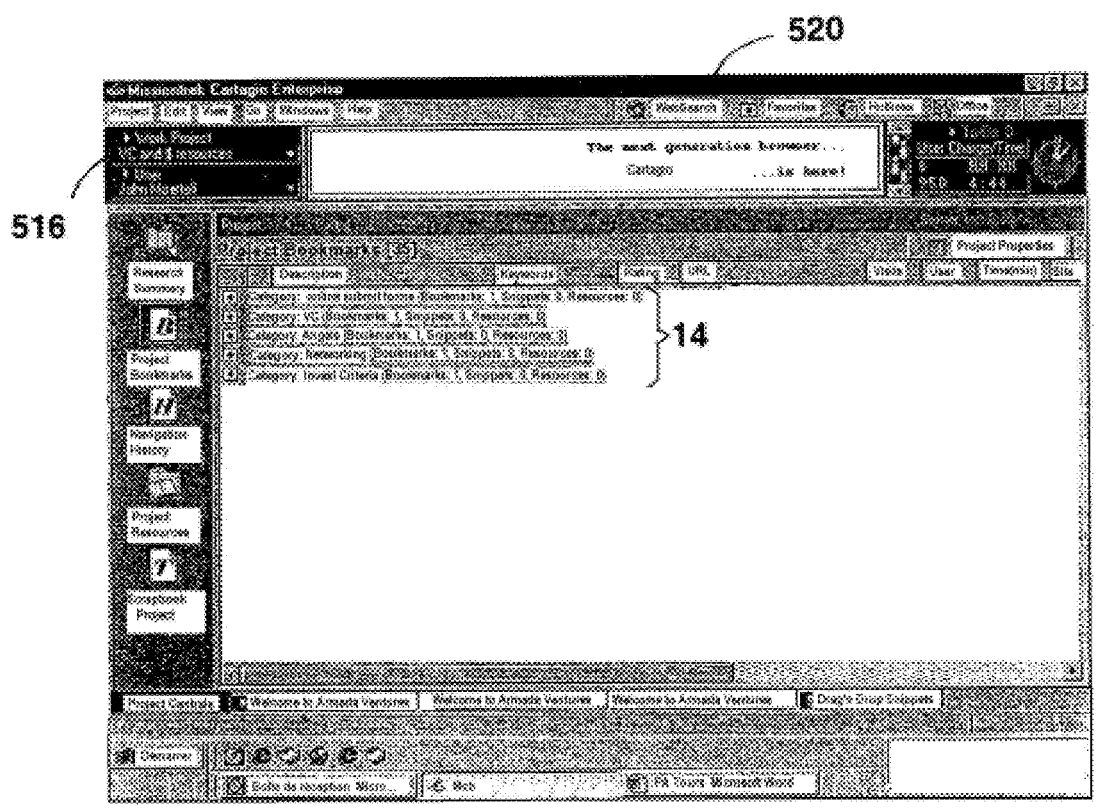
FIGS. 24 and 25 are screen prints of the GUI showing a project-oriented link list on which the invention acts.

Referring now to FIG. 24, a screenshot of the GUI 520 is shown of the categories of links 14 which are associated with the theme "VC and $ resources" project.

Figure 25:
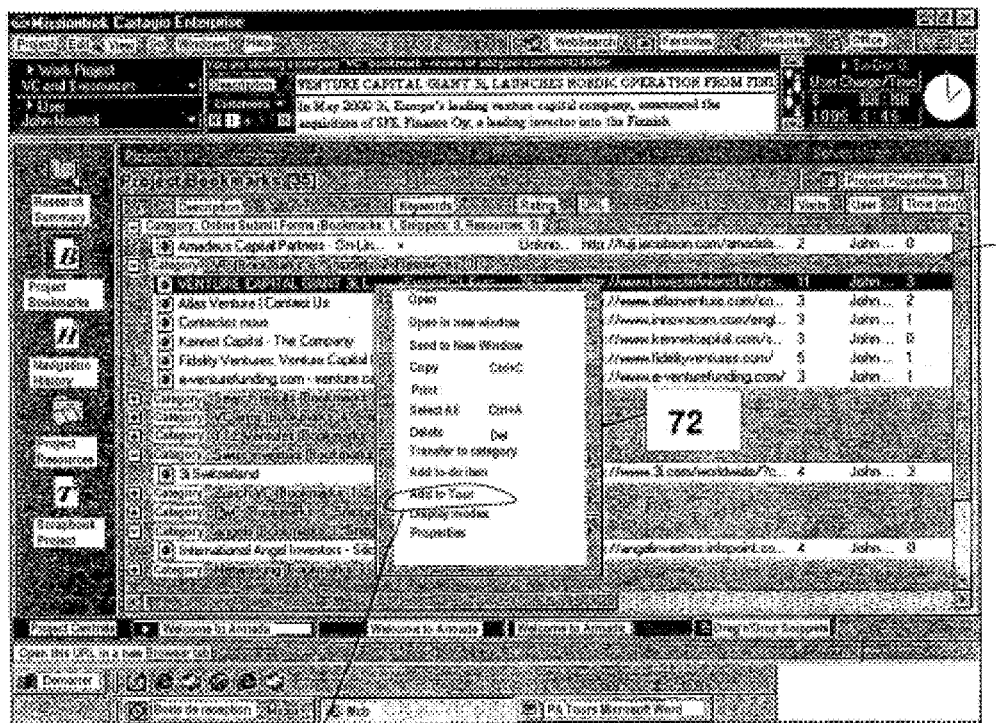

Referring now to FIG. 25, a screenshot of the GUI 520 of links 66 is shown which have been expanded from the associated categories 570 among the categories of links 514.

Figure 26:
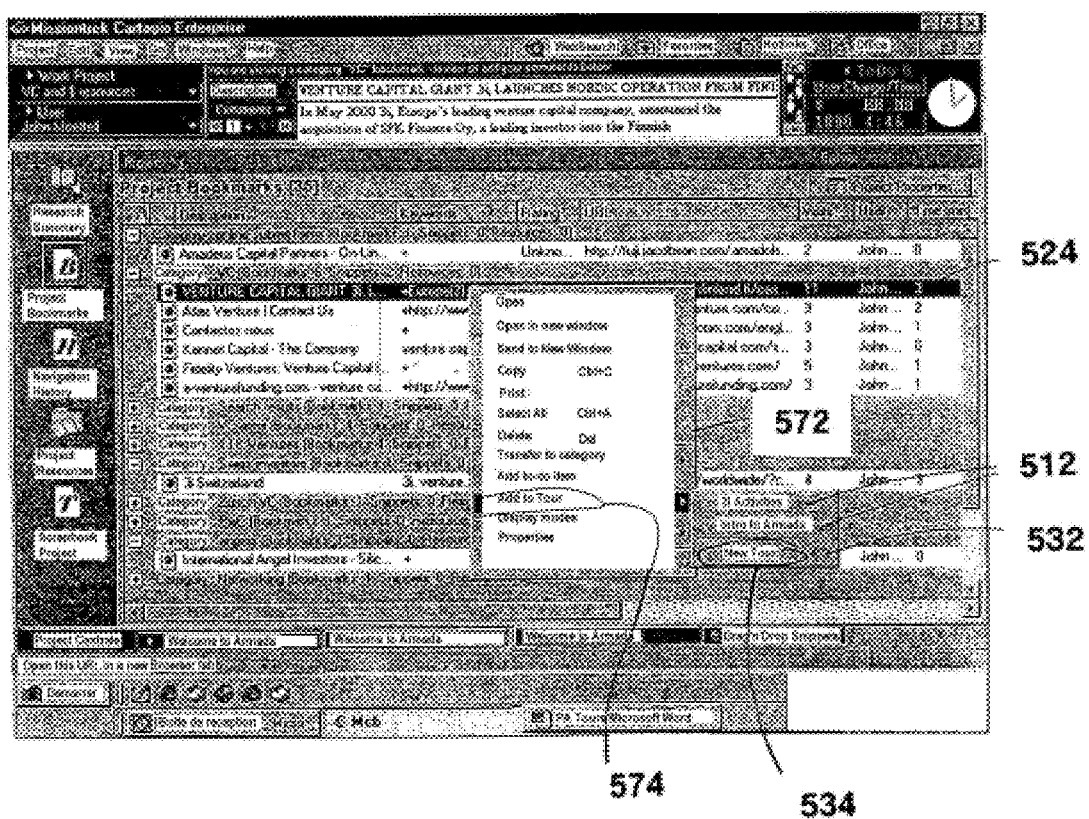
FIGS. 26 to 31 are screen prints of the GUI showing the tour creation means of the system of the invention.
Figure 28:
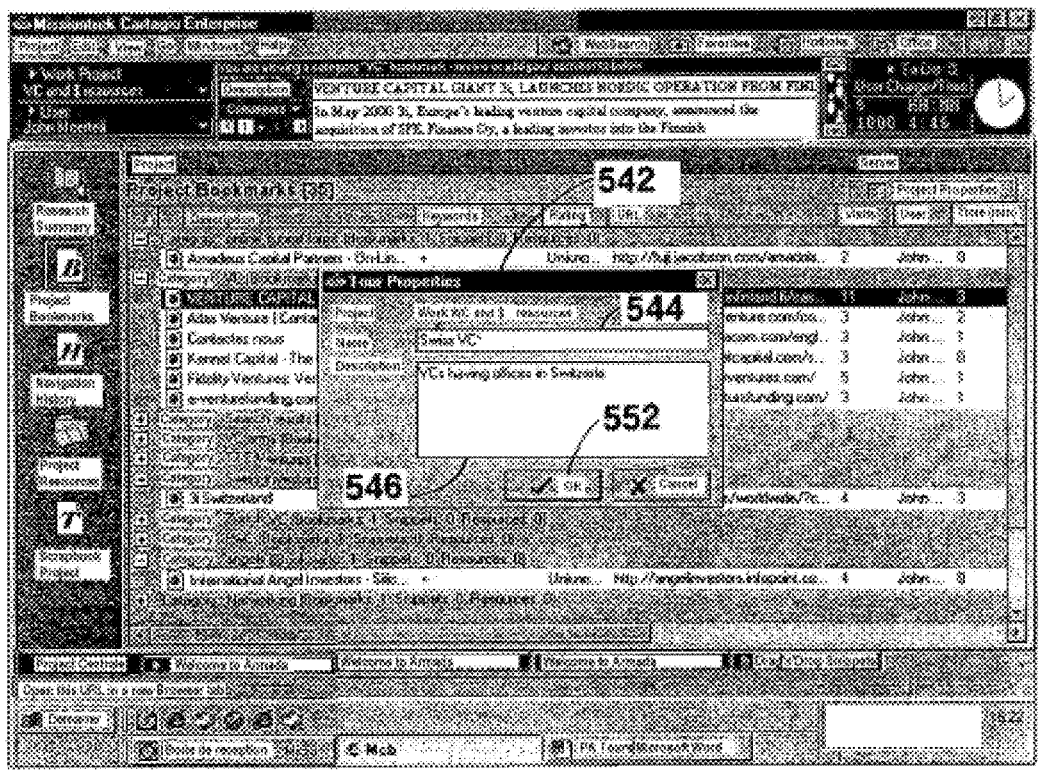
Figure 29:
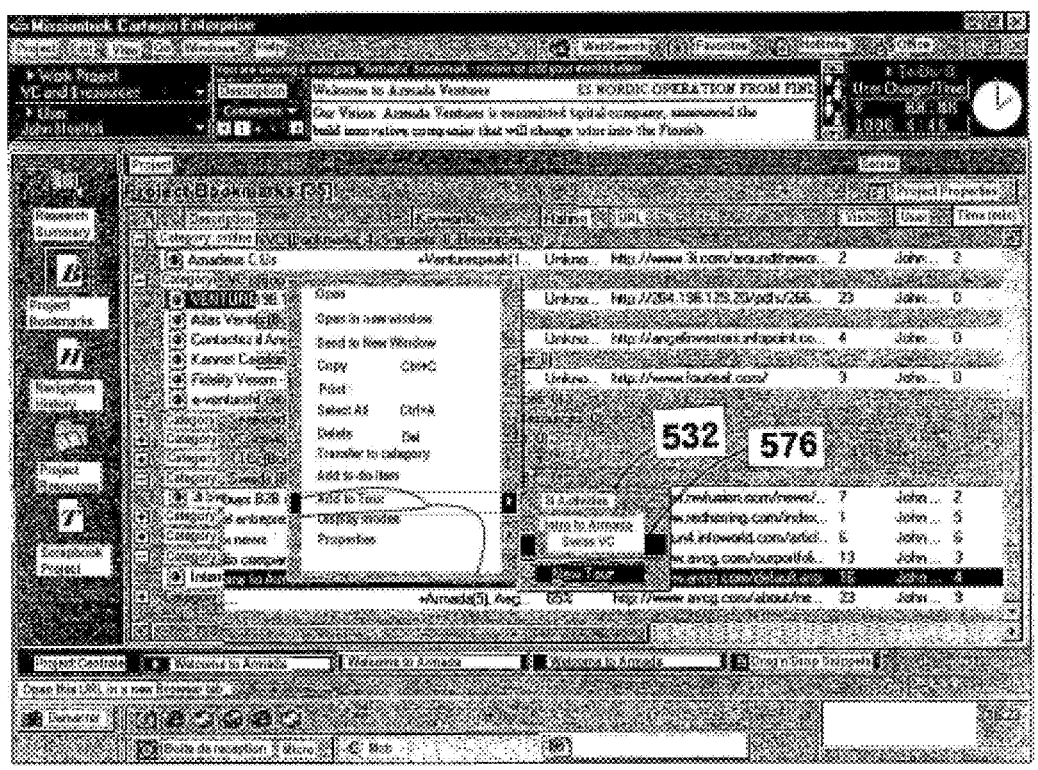
Figure 30:
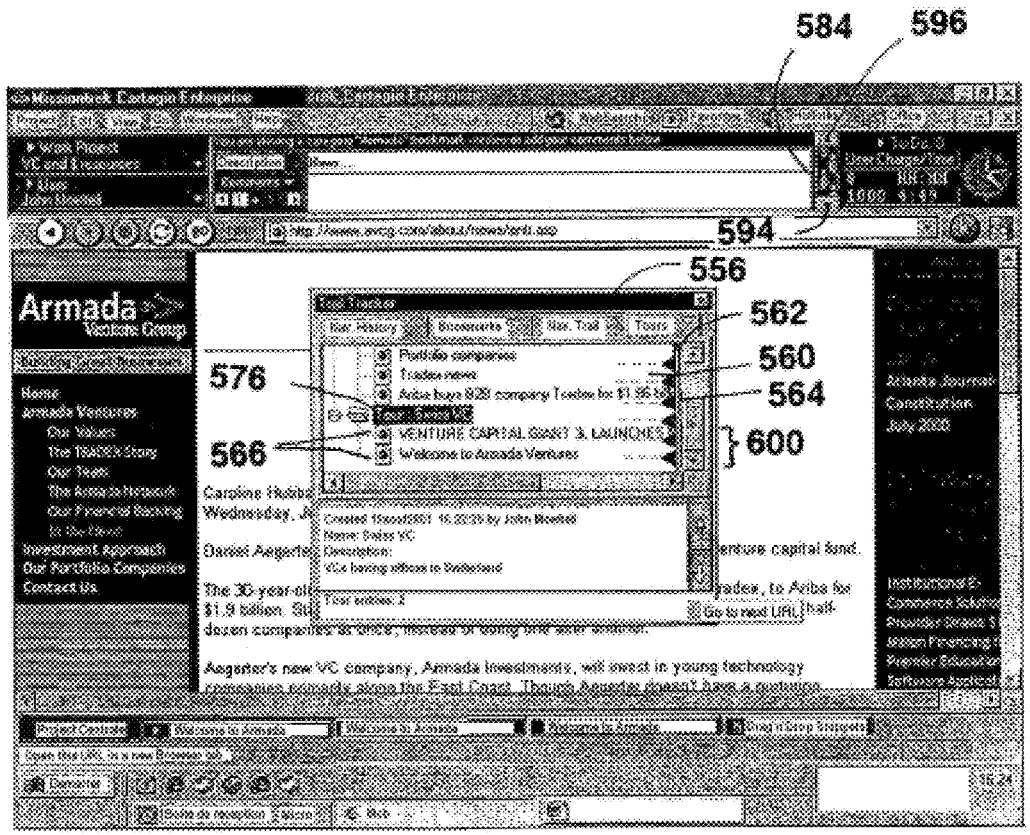

Referring now to FIG. 26, a screenshot of the GUI 520 is shown in which one of the links 66 is activated/highlighted and, after a right mouse button click, a menu 572 opens in which several menu options are presented, among them, an "add to tour" menu item 574. Referring again to FIG. 27 and to FIG. 28, when the "add to tour" menu item 574 is selected, the menu 532 is displayed, allowing the user to select an exiting tour or define a "new tour" 534. Referring now to FIG. 29, a tour properties dialog 542 opens in which the name field 44 and a description field 546 are provided, into which the user inputs the tour name and optionally a tour description. The user clicks "OK" 552 to save the new tour or "cancel" to cancel the tour creation submethod. As can be seen in the figure, the name selected in this example tour is "Swiss VC" and the description given is "VCs having offices in Switzerland". Now, when another link 566 is selected and the steps are taken to add this link to the "Swiss VC" tour, as shown in FIG. 30, then, in a tour following dialog (a.k.a. tour status window) 556 labeled "trail tracker", the links 66 selected for the "Swiss VC" tour appear under the tour name 576.

Figure 32:
FIG. 32 is a logic flow diagram of the tour following submethod of the invention.

Referring now to FIG. 32, in a tour following (TF) submethod 580, the method 510 further enables users to follow any tour so created, and includes the following steps. In a first step 582, when an icon 584 (shown in FIG. 31) is clicked, the TF submethod 580 presents the user with a tour status window 556 that includes a tour selection mechanism. In a second step 586, the submethod 80 opens a tour 576 when such is selected by the user. In a third optional step 590, the tour status window 556 closes. In a fourth step 592, the submethod 580 responds to user navigation directives after, for example, the user clicks on a trail tracker down arrow 594 or up arrow 596 (shown in FIG. 31), by locating and automatically consecutively or selectively downloading for view html pages located at the URLs of the list of URLs 600.

Figure 33:
FIGS. 33 to 34 are screen prints of the GUI showing the tour following means of the system of the invention.
Figure 34:
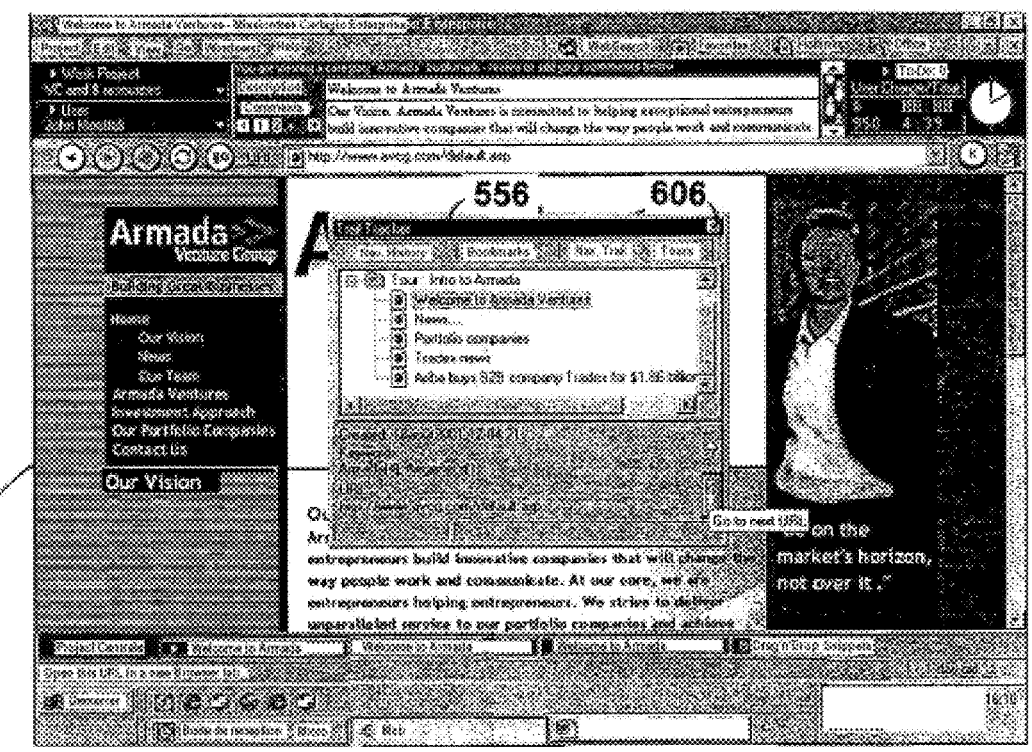
Figure 35:
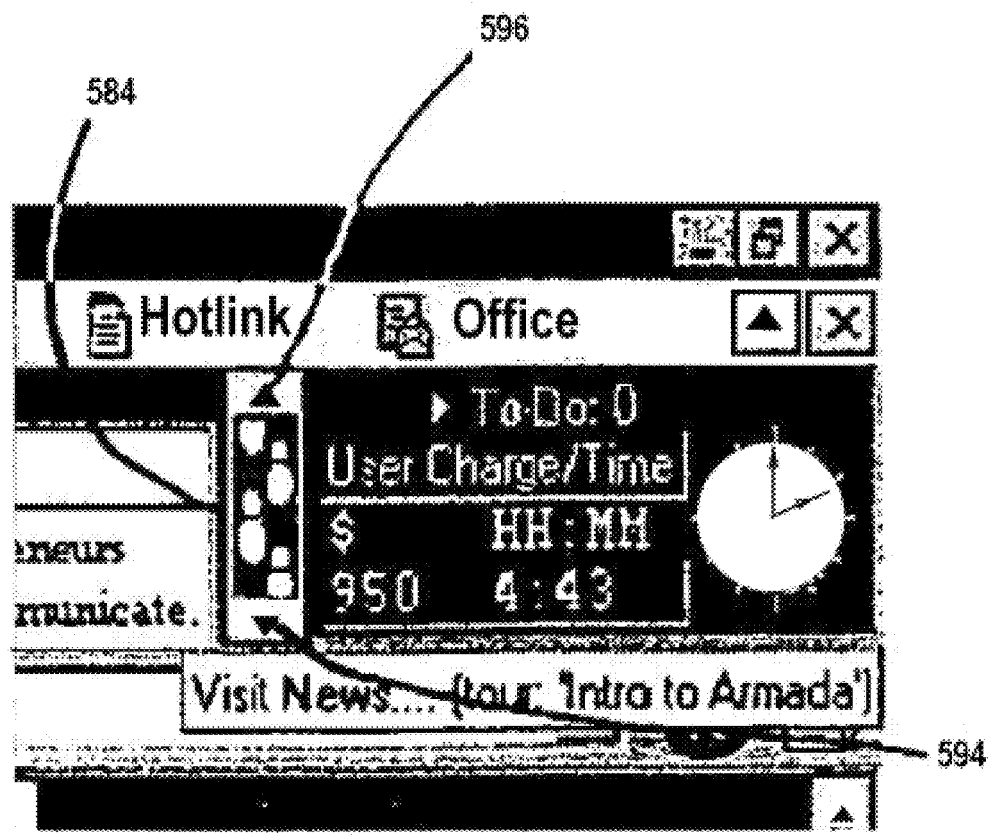
FIG. 35 is a partial view of GUI of the invention, showing the upper right portion thereof.
Figure 36:
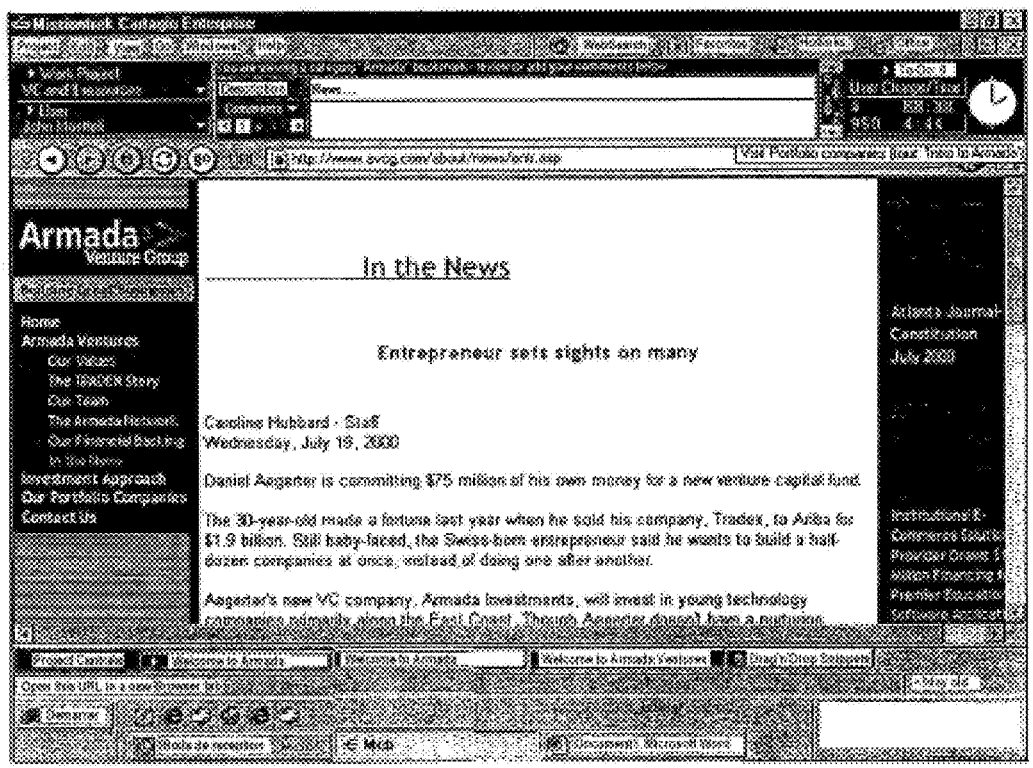
FIGS. 36–37 are further screen prints of the GUI showing the tour following means of the system of the invention.
Figure 37:
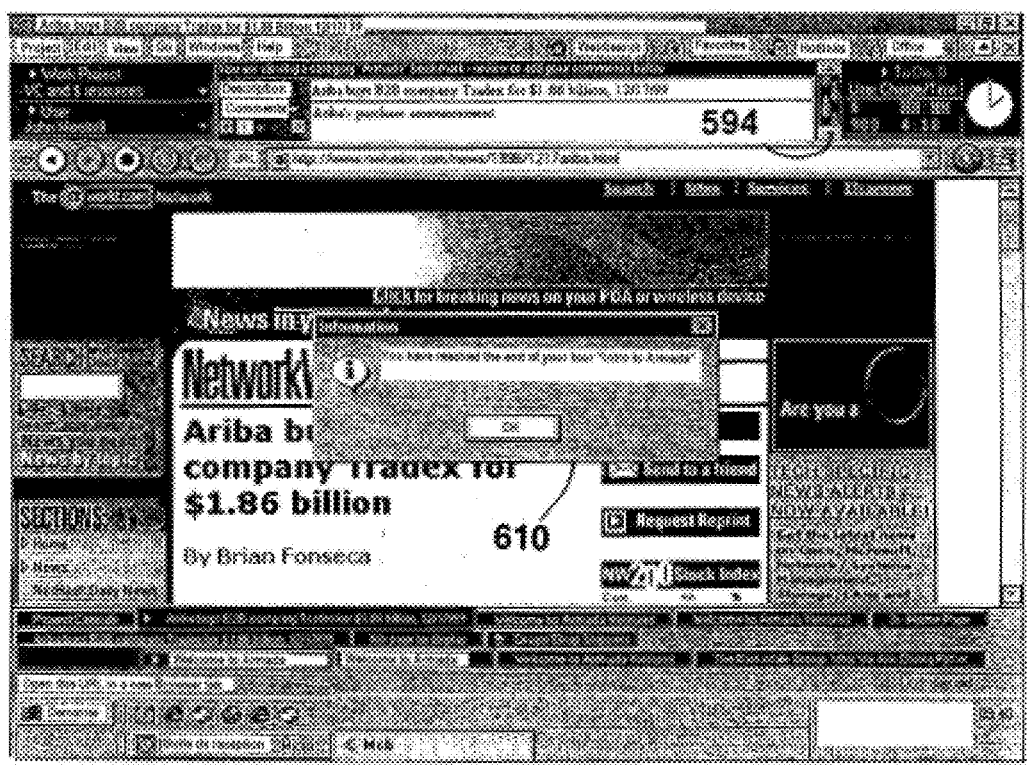
Figure 38:
FIG. 38 is a screen print of the GUI showing the tour end marker of the invention.

Referring now to FIG. 33, the trail tracker popup is shown prior to creating the Swiss VC tour. It should be noted that the existing tours "3i Activities" 6102 and "Intro to Armada" 604. Referring to FIG. 34, the trail tracker popup 556 shows an expanded view of the "Intro to Armada" tour. Referring to FIG. 35, a first tour link "Welcome to Armada Ventures" 566 is selected and the html page at the corresponding URL is displayed in the display window 528. In FIG. 36, the trail tracker popup 556 has been closed by clicking the "x" close icon 6106 (shown in FIG. 35). By clicking on the down arrow icon 594, navigation advances to the next URL in the tour list 600, shown in FIG. 37. In FIG. 38, when the last URL 566 in the tour is reached and the user clicks the arrow icon 94, a popup end-of-tour window 610 opens.

Figure 39:
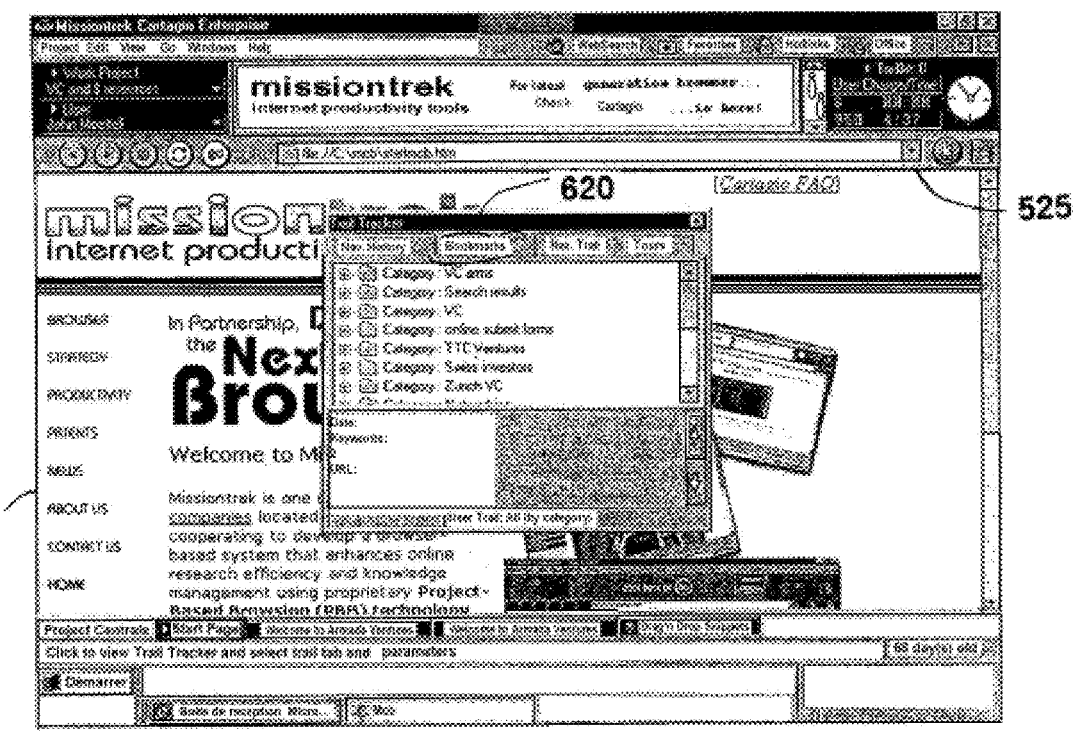
FIGS. 39 to 40 are screen prints of the GUI showing optional trails that can be followed using a trail following submethod of the invention.
Figure 40:

Referring now to FIG. 38, the trail tracker popup 556 is shown, showing an optional trail to follow, in this case, "nav history" 612. This trail can be followed optionally by pressing on the down or up arrows 614 and 616 respectively. In FIG. 39, still another optional trail, "Bookmarks" 620, is shown. In FIG. 40, still another optional trail, "Nav. Trail", 622 is shown.

In a first advantage of the present invention, users are provided with summaries summarizing the contents of a potentially long list of links, many of which may not be of interest to them.

In a second advantage of the invention, such summaries can be specifically written for a particular user, and, using the commenting feature of the invention, include detailed comments of great potential interest to the user, thus reducing the time the user must spend seeking the most pertinent information in a project.

In another advantage of the present invention, users are directed to perform research on the Internet, one project at a time.

In another advantage of the invention, users are provided with tools needed to postpone possibly irrelevant research or research which should be directed to another project name, thus enabling them to perform research one project at a time.

In another advantage, a system administrator may monitor Internet usage on a user basis, granting or denying access to particular categories of sites, depending on the business goals of the enterprise.

In another advantage, the method demands the creation of an organized system of bookmarks and URL, organized in association with project names.

In another advantage, the method permits collaborative browsing in which the experience gained from one person's research can be efficiently shared (through notations and comments) with others within the organization. Further, by e-mailing importable project summaries to clients or outside service providers, the experience gained within an organization can be shared with those outside an organization.

The invention has a further technical effect in that the method causes the computer screen to present a user with control means that the user can use to more efficiently manage the downloading of information for viewing by the user on the computer screen. Thus, the method 60 controls or directs an Internet research session. The resulting efficient acquisition of information is applicable industrially in every domain of technology.

The invention involves technical issues such as the ordering and control of the communication paths selected to access digital information on a network.

The figures illustrate one method for practicing the present invention. The flow diagrams described herein broadly illustrate the logical flow of steps to perform one embodiment of the present invention. Accordingly, numerous steps may be added to, or taken away from the flow diagrams, irrespective of any occasional use of the term "optionally", without departing from the scope of the invention. Furthermore, the order of execution of the steps in the flow diagrams may be changed without departing from the scope of the invention. Additional considerations in implementing the method described by the flow diagrams may also dictate changes in the selection and order of the steps.

Multiple variations and modifications are possible in the embodiments of the invention described here. Although certain illustrative embodiments of the invention have been shown and described here, a wide range of modifications, changes, and substitutions is contemplated in the foregoing disclosure. In some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed is:

1. A program tangibly embodied on a computer-readable medium for creating customized summaries of web pages, wherein the program operates on an Internet browser and is adapted to manage Internet research in a research session through use of the Internet browser, wherein navigation on the Internet by a user comprises automatically associating URLs accessed by the user with a pre-defined project name and wherein information regarding user-selected URLs, selected from at least the automatically-associated URLs, is stored in a computer storage medium, wherein said information comprises URL addresses and references to the predefined project name, the program comprising:

a. instructions for activating one of said user-selected URLs;

b. instructions for opening a tour dialog box for creating and/or editing a thematic tour of the user-selected URLs; and c. instructions for presenting a menu option enabling the user to identify an existing tour or to create a new tour with which the activated user-selected URL is associated, wherein:

if the user identifies an existing tour, adding the activated user-selected URL into the existing tour; or if the user creates a new tour, presenting an input window to the user prompting the user to input a tour name and saving the new tour for later access through the browser, wherein the adding of the URL in an existing tour is accomplished using a link insert mechanism inserting the selected URL in a desired order among any already existing links in the tour, wherein the link insertion mechanism is a selected link insertion device interposed between adjacent links in a thematic link list.

2. A program tangibly embodied on a computer-readable medium for creating customized summaries of web pages, wherein the program operates on an Internet browser and is adapted to manage Internet research in a research session through use of the Internet browser, wherein navigation on the Internet by a user comprises automatically associating URLs accessed by the user with a pre-defined project name and wherein information regarding user-selected URLs, selected from at least the automatically-associated URLs, is stored in a computer storage medium, wherein said information comprises URL addresses and references to the predefined project name, the program comprising:

a. instructions for activating one of said user-selected URLs;

b. instructions for opening a tour dialog box for creating and/or editing a thematic tour of the user-selected URLs; and c. instructions for presenting a menu option enabling the user to identify an existing tour or to create a new tour with which the activated user-selected URL is associated, wherein:

if the user identifies an existing tour, adding the activated user-selected URL into the existing tour; or if the user creates a new tour, presenting an input window to the user prompting the user to input a tour name and saving the new tour for later access through the browser, wherein the adding of the selected URL is accomplished using a tour link editing submethod, wherein said submethod comprises:

instructions for presenting the user with a tour status window which displays existing links in the tour and facilitates the editing of these links through the execution of several steps; and instructions for inserting the selected URL in a desired order among any already existing URLs in the tour, wherein the link insertion mechanism is a selected link insertion device interposed between adjacent links in a thematic link list.

3. A program tangibly embodied on a computer-readable medium for creating customized summaries of web pages, wherein the program manages Internet research in a research session through use of an Internet browser, wherein navigation on the Internet by a user using the Internet browser includes automatically associating URLs accessed by the user with a pre-defined project name and wherein information regarding user-selected URLs, selected from at least the automatically-associated URLs, is stored in a computer storage medium, wherein said information comprises URL addresses and references to the predefined project name, the program comprising:
  a. instructions for activating one of said user-selected URLs from a thematic listing of URL links;
  b. instructions for opening a tour dialog box for creating and/or editing a thematic tour of the user-selected URLs; and
  c. instructions for presenting the user with a menu option enabling the user to identify an existing tour or to create a new tour with which the activated user-selected URL is associated, wherein:
    if the user identifies an existing tour, adding the activated user-selected URL into the existing tour; or
    if the user creates a new tour, presenting an input window to the user prompting the user to input a tour name and saving the new tour,
wherein the adding of the selected URL in an existing tour is accomplished using a link insert mechanism inserting the selected URL in a desired order among any already existing URLs in the tour, wherein said link insertion mechanism is a selected link insertion device interposed between adjacent links in the thematic link list.

4. A program tangibly embodied on a computer-readable medium for creating customized summaries of web pages, wherein the program operates on an Internet browser and is adapted to manage Internet research in a research session through use of the Internet browser, wherein navigation on the Internet by a user comprises automatically associating URLs accessed by the user with a pre-defined project name and wherein information regarding user-selected URLs, selected from at least the automatically-associated URLs, is stored in a computer storage medium, wherein said information comprises URL addresses and references to the predefined project name, the program comprising:
  a. instructions for activating one of said user-selected URLs;
  b. instructions for opening a tour dialog box for creating and/or editing a thematic tour of the user-selected URLs; and
  c. instructions for presenting a menu option enabling the user to identify an existing tour or to create a new tour with which the activated user-selected URL is associated, wherein:
    if the user identifies an existing tour, adding the activated user-selected URL into the existing tour; or
    if the user creates a new tour, presenting an input window to the user prompting the user to input a tour name and saving the new tour for later access through the browser,
wherein the adding of the URL in an existing tour is accomplished using a link insert mechanism inserting the selected URL in a desired order among any already existing links in the tour, and:
    instructions for presenting a selected link insertion device interposed between adjacent links in a thematic link list.

5. A program tangibly embodied on a computer-readable medium for creating customized summaries of web pages, wherein the program operates on an Internet browser and is adapted to manage Internet research in a research session through use of the Internet browser, the program comprising:
  a. instructions for activating a user-selected URL from a thematic listing of URL links;
  b. instructions for opening a tour creation dialog; and
  c. instructions for presenting the user with a menu option in the tour creation dialog enabling the user to identify an existing tour or to create a new tour, wherein:
    if the user identifies an existing tour, adding the activated user-selected URL into the existing tour; or
    if the user creates a new tour, presenting an input window to the user prompting the user to input a tour name and saving the new tour,
wherein the adding of the selected link is accomplished using a tour link editing submethod, wherein the submethod comprises:
    instructions for presenting the user with a tour status window which displays all existing URLs in the tour and facilitates editing of these URLs; and
    instructions for inserting the selected URL in a desired order among any already existing URLs in the tour using a link insertion mechanism,
wherein the link insertion mechanism is a selected link insertion device interposed between adjacent links in the thematic link list.

* * * * *